US00RE38834E

(19) United States
(12) Reissued Patent
Perra

(10) Patent Number: US RE38,834 E
(45) Date of Reissued Patent: Oct. 18, 2005

(54) SAFETY TRIP ASSEMBLY AND TRIP LOCK MECHANISM FOR A FASTENER DRIVING TOOL

(75) Inventor: Arthur E. Perra, Hope Valley, RI (US)

(73) Assignee: Stanley Fastening Systems, LP, East Greenwich, RI (US)

(21) Appl. No.: 10/392,978

(22) Filed: Mar. 21, 2003

Related U.S. Patent Documents

Reissue of:
(64) Patent No.: 6,209,770
Issued: Apr. 3, 2001
Appl. No.: 09/541,059
Filed: Mar. 31, 2000

U.S. Applications:
(60) Provisional application No. 60/127,836, filed on Apr. 5, 1999.

(51) Int. Cl.[7] ..... B25C 1/04
(52) U.S. Cl. ..... 173/8; 173/120; 173/142
(58) Field of Search ..... 173/8, 120, 130, 173/142

(56) References Cited

U.S. PATENT DOCUMENTS

| | | | |
|---|---|---|---|
| 3,708,096 | A | 1/1973 | Burke |
| 4,197,974 | A | 4/1980 | Morton et al. |
| 4,597,517 | A | 7/1986 | Wagdy |
| 4,767,043 | A | 8/1988 | Canlas, Jr. |
| 4,821,937 | A | 4/1989 | Rafferty |
| 5,219,110 | A | 6/1993 | Mukoyama |
| 5,261,587 | A | 11/1993 | Robinson |
| 5,263,626 | A | 11/1993 | Howard et al. |
| 5,263,842 | A | 11/1993 | Fealey |
| 5,385,286 | A | 1/1995 | Johnson, Jr. |
| 5,564,614 | A | 10/1996 | Yang |
| 5,579,977 | A | 12/1996 | Yang |
| 5,593,079 | A | 1/1997 | Mukoyama et al. |
| 5,667,127 | A | 9/1997 | Ichikawa et al. |
| 5,685,473 | A | 11/1997 | Shkolnikov et al. |
| 5,785,227 | A | 7/1998 | Akiba |
| 5,816,468 | A | 10/1998 | Yang |
| 5,839,638 | A | 11/1998 | Ronn |

OTHER PUBLICATIONS

Photographs of N55C Coil Nailer with Depth Adjustment Kit (FIGS. 1–8).

*Primary Examiner*—Scott A. Smith
(74) *Attorney, Agent, or Firm*—Pillsbury Winthrop LLP

(57) ABSTRACT

A fastener driving tool includes a housing assembly with a nosepiece assembly defining a drive track. A driving mechanism is housed within the housing assembly to drive a fastener through the drive track and into a workpiece in response to a trigger. The tool includes a safety trip assembly which includes a trigger enabling portion and a workpiece engaging portion and is movable between an extended disabling position and a retracted enabling position. The safety trip assembly is biased toward the extended position and is moved toward the retracted position by engagement between the workpiece and the workpiece engaging member. The workpiece engaging portion is movable to permit adjustment of a length of the safety trip assembly. The safety trip assembly includes a coupling mechanism including a fixed locking structure formed on an exterior portion of the workpiece engaging portion and a manually operable locking mechanism. The locking mechanism is carried by the trigger enabling portion and includes a locking member mounting structure and has a manually operable locking member mounted thereon. The movable locking member is biased into a locking position, engaging the fixed locking structure and preventing relative movement between the workpiece engaging portion and the trigger enabling portion and may move into a releasing portion disengaging the fixed locking structure and permitting such relative movement. A user may manually move the locking mechanism against the bias by engaging the movable locking member and moving it from the locking position to the releasing position.

74 Claims, 12 Drawing Sheets

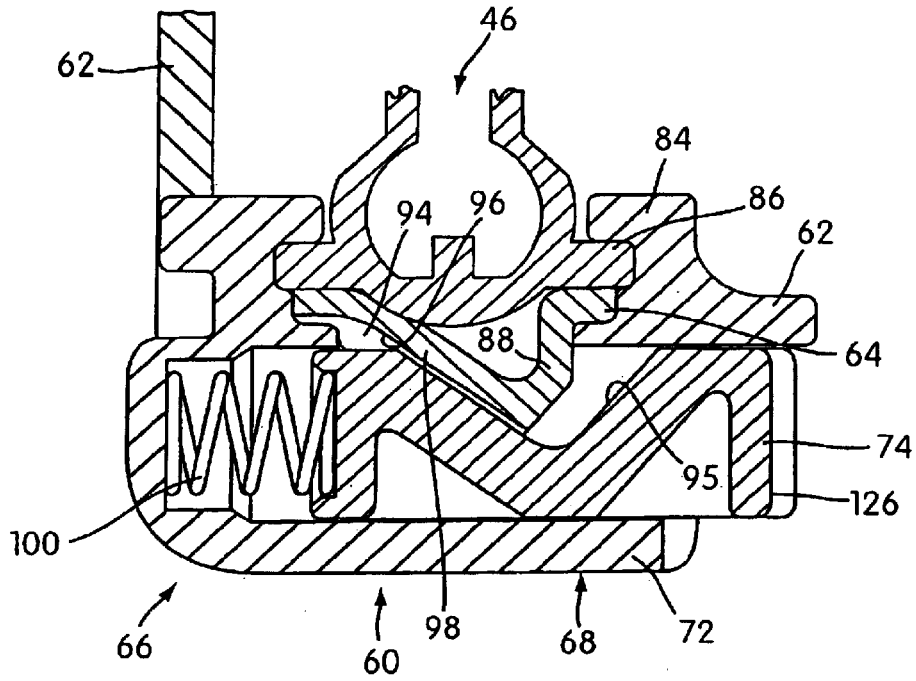
FIG. 7
(AMENDED)
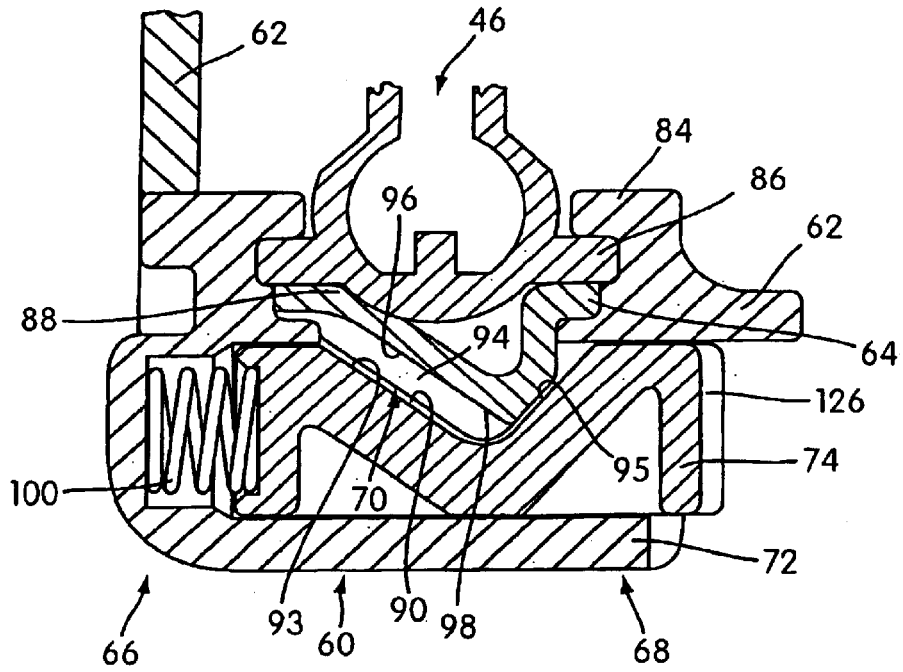
FIG. 8
(AMENDED)

SAFETY TRIP ASSEMBLY AND TRIP LOCK MECHANISM FOR A FASTENER DRIVING TOOL

Matter enclosed in heavy brackets [ ] appears in the original patent but forms no part of this reissue specification; matter printed in italics indicates the additions made by reissue.

This application claims benefit to provisional application Ser. No. 60/127,836 filed Apr. 5, 1999.

BACKGROUND OF THE INVENTION

Power operated fastener driving devices are in widespread use in the construction and building trades and typically include a power operated driving mechanism mounted within a housing that powers the driving movement of a drive element slidably mounted within a drive track that extends through a nose piece mounted to the housing. Typically when the driving mechanism is actuated, the drive element moves in a fastener driving direction through a drive stroke and then moves in the opposite direction through a return stroke during one cycle of operation. A trigger mechanism that is movable through an actuation stroke is commonly provided on the exterior of the housing to initiate an operating cycle.

A magazine assembly mounted to the housing supplies a series of fasteners to the drive track through a lateral opening in the same and the leading fastener in the drive track is driven outwardly of the drive track into a workpiece by the driving movement of the drive element when the driving mechanism is actuated. Typically a spring biased fastener feeding device advances the fasteners through the magazine toward and into the drive track.

It is not desirable to actuate the driving mechanism when there is no fastener in the drive track or when the drive track is not in contact with a workpiece that will receive the fastener, because it is preferable that the energy transferred to the driving element and related structures during the drive cycle be absorbed by the movement of the fastener into the workpiece. When no fastener is present in the drive track when the driving mechanism is actuated, for example, the driving device must absorb all of the energy generated during the drive stroke and this subjects the device to an undesirable level of stress. It is also undesirable to actuate the driving mechanism when no fastener is in the drive track and the nosepiece is against the workpiece because the driving element typically extends out of the nosepiece when the driver is at the lowermost point of its power stroke so that the fastener can be drive flush or countersunk in the workpiece. Thus, if no fastener is present in the drive track, the driving element will mar the surface of the workpiece.

Power operated fastener driving devices typically include a trip assembly mounted on the nosepiece and operatively associated with the trigger mechanism to prevent the driving mechanism from being actuated when the nosepiece is not in contact with a workpiece. Typically, when the nosepiece is placed in contact with the workpiece, the trip assembly moves with respect to the workpiece and places the trigger mechanism in an active condition so that the driving mechanism can be actuated by movement of the trigger mechanism through its actuation stroke. Conventionally constructed trip assemblies do not prevent the driving mechanism from being actuated when the magazine is removed from the housing and/or the magazine is empty or nearly empty to prevent actuation of the driving mechanism when there is not fastener in the drive track, however, and this is a significant shortcoming of prior trip assembly design because it can result in damage to or marring of the surface of the workpiece. A need exists, therefore, for a power operated fastener driving device that cannot be actuated when the magazine is removed from the housing or when the magazine is empty or nearly empty.

Often the trip assemblies of fastener driving devices include adjustable mechanisms that can be adjusted to control the depth to which a fastener is driven into the workpiece. Typically these adjustments to a trip assembly require the use of hand tools and are time consuming to effect. A need exists for a trip assembly that can be easily adjusted manually without the use of hand tools to change the depth to which the fasteners are driven.

SUMMARY OF THE INVENTION

To meet these needs, the present invention provides a safety trip assembly that is easily manually adjusted without the use of hand tools to adjust the depth to which a fastener is driven into a workpiece. More specifically, the invention provides a fastener driving tool for driving fasteners into a workpiece that includes a housing assembly and a nosepiece assembly included in the housing assembly that defines a longitudinally-extending fastener drive track. A fastener driving mechanism carried internally of the housing assembly is constructed and arranged to drive a fastener through the fastener drive track and into a workpiece when the fastener drive mechanism is selectively activated by a user. A manually actuatable trigger mechanism is constructed and arranged to activate the fastener driving mechanism when manually actuated by a user.

A safety trip assembly is coupled to the housing assembly for longitudinal movement with respect to the nosepiece assembly. The safety trip assembly includes a trigger enabling portion and a workpiece engaging portion releasably coupled to the trigger enabling portion. The safety trip assembly is constructed and arranged to the movable between an extended position and a retracted position whereby the trigger enabling portion 1) enables the trigger mechanism to activate the fastener driving mechanism when manually actuated by a user when the safety trip assembly is in the retracted position and 2) disables the trigger mechanism when the safety trip assembly is not in the retracted position.

The safety trip assembly is constructed and arranged to be biased toward the extended position and to be moved toward the retracted position by engaging a longitudinal end of the workpiece engaging portion with a surface of a workpiece and pressing the housing assembly toward the workpiece, thereby moving the safety trip assembly against the bias with respect to the nosepiece assembly and a body portion of the housing assembly.

The safety trip assembly includes a releasable coupling mechanism for releasably coupling the trigger enabling portion to the workpiece engaging portion. The workpiece engaging portion of the safety trip assembly is constructed and arranged to be movable with respect to the trigger enabling portion when the workpiece engaging portion is uncoupled from the trigger enabling portion to permit adjustment of a longitudinal length of the safety trip assembly.

The releasable coupling mechanism includes fixed locking structure formed on an exterior portion of the workpiece engaging portion and a manually operable locking mechanism that is carried by the trigger enabling portion. The locking mechanism includes a locking member mounting structure rigidly attached to the trigger enabling portion adjacent the fixed locking structure formed on the workpiece engaging portion and a manually-operable, movable locking member mounted on the locking member mounting structure so as to be movable with respect thereto between a locking position and a releasing position. The movable locking member is constructed and arranged to engage the fixed locking structure when the movable locking member is in the locking position to interlock the movable locking member and the fixed locking structure to thereby prevent relative movement between the workpiece engaging portion and the trigger enabling portion and to disengage from the fixed locking structure when the movable locking member is in the releasing position to thereby permit relative movement between the workpiece engaging portion and the trigger enabling portion.

A locking member biasing mechanism is operatively associated with the movable locking member and is constructed and arranged to generate a biasing force to urge the movable locking member into its locking position. The movable locking member and the locking member biasing mechanism are constructed and arranged to permit the movable locking member to be manually moved against the biasing force by a hand of the user engaging the movable locking member to move the movable locking member from its locking position to its releasing position and to permit the movable locking member to automatically return to the locking position when the movable locking member is disengaged by the user's hand.

The invention further provides a trip lock mechanism mounted to the nosepiece assembly and operatively associated with a fastener magazine assembly, a fastener feeding mechanism disposed in the magazine assembly and the safety trip assembly to prevent the fastener driving mechanism from being actuated when the magazine assembly is out of or nearly out of fasteners and/or when the fastener magazine assembly is removed from the device. More specifically, the fastener magazine assembly is releasably attached to the housing assembly in an operative manner with respect to a lateral opening formed in the nosepiece assembly to communicate a succession of fasteners from the fastener magazine assembly to the drive track. The magazine assembly includes an inner portion defining a fastener supply channel in communication with the lateral opening. The fastener magazine assembly is constructed and arranged to hold a supply of fasteners within the fastener supply channel in an operative orientation for feeding fasteners from the fasteners supply channel through the lateral opening and into the fastener drive track. The fastener magazine assembly includes a biased fastener feeding mechanism movably mounted therein that is constructed and arranged to be positioned behind a supply of fasteners disposed within the fastener supply channel and to urge the same through the fastener supply channel then through the lateral opening and into the fastener drive track.

The trip lock mechanism includes a movable trip lock member carried on the nosepiece assembly and is movable between a neutral orientation and a locking orientation. The trip lock mechanism and the safety trip assembly cooperate to: (1) permit the safety trip assembly to be moved from the extended position to the retracted position when the movable trip lock member is in the neutral orientation to thereby permit to trigger mechanism to be activated and (2) prevent the safety trip assembly from being moved from the extended position to the retracted position when the movable trip lock member is in the locking orientation to thereby prevent the trigger mechanism from being activated. The trip lock mechanism includes a biasing member that is constructed and arranged to generate a biasing force to urge the movable trip lock member toward the locking orientation.

The fastener magazine assembly is constructed and arranged to engage the trip lock mechanism when the fastener magazine assembly is attached to the housing assembly to move the trip lock member against the biasing force to the neutral orientation. The trip lock member is constructed and arranged to move the locking orientation under the biasing force when the fastener magazine assembly is removed from the housing to prevent the trigger mechanism from being activated when the fastener magazine assembly is removed from the housing assembly.

The fastener feeding mechanism is constructed and arranged to engage the trip lock mechanism when the fastener supply channel is empty to move the fastener lock member from the neutral orientation to the locking orientation to prevent the trigger mechanism from being activated when the fastener supply channel is empty.

BRIEF DESCRIPTION OF THE DRAWINGS

FIG. 7 is a cross-sectional view taken through the line 7—7 of FIG. 1 showing a movable locking member of a releasable coupling mechanism of the safety trip assembly in *a* locking position;

FIG. 8 is a view similar to that of FIG. 7 but showing a movable locking member in a releasing position;

DETAILED DESCRIPTION OF THE PREFERRED EMBODIMENT AND BEST MODE OF THE INVENTION

Figure 1:
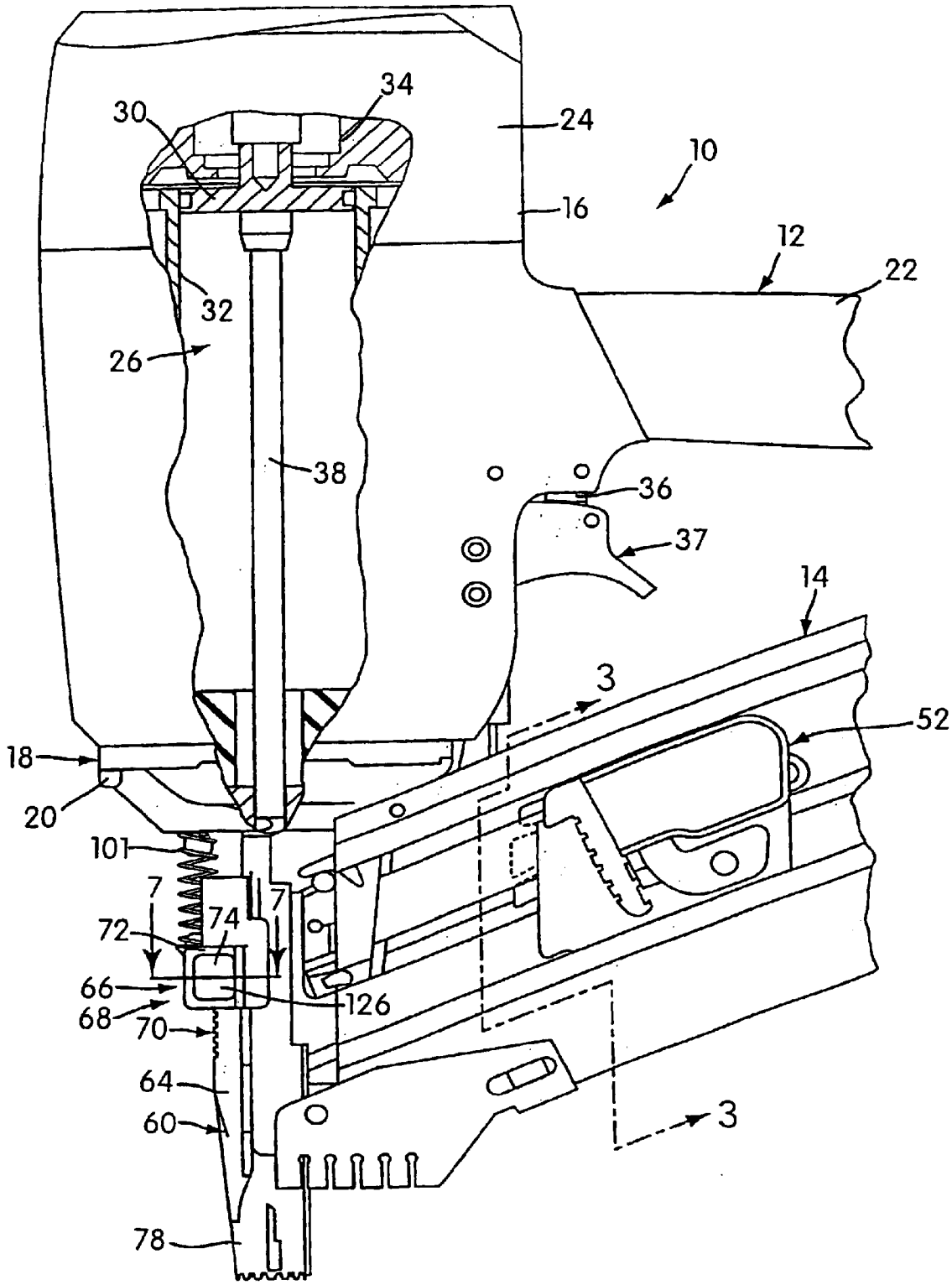
FIG. 1 is a fragmentary side elevational view of a fastener driving device constructed according to the principles of the present invention showing a portion of a housing assembly broken away to show a fastener driving mechanism of the device.

FIG. 1 shows a portable power operated fastener driving tool, generally designated 10, constructed according to the principles of the present invention. The fastener driving tool 10 includes a housing assembly 12 and a fastener magazine assembly 14. The housing assembly 12 includes a housing structure 16 which may be of conventional construction and a nosepiece assembly 18 secured thereto by conventional fasteners 20.

The housing structure 16 includes a hollow handle grip portion 22, the interior of which forms a reservoir for pressurized air supplied by a conventional pressurized air source (not shown) in communication therewith. The grip portion 22 is integrally formed with a vertically extending portion 24 of the housing structure 16 which contains a fastener driving mechanism 26 of conventional construction. A portion of the housing structure 16 has been broken away in FIG. 1 to show the construction of the fastener driving mechanism 26.

The fastener driving mechanism 26 is constructed and arranged to drive a fastener through a longitudinally extending fastener driving track 28 (best seen in the cross-sectional view of FIG. 2) outwardly into a workpiece when the fastener driving mechanism 26 is selectively actuated by a worker using the fastener driving tool 10.

The fastener driving mechanism 26 includes a piston 30 mounted within a cylindrical chamber 32 in the housing structure 16 for movement from an upper position (shown in FIG. 1) through a drive stroke in to a lowermost position and from the lowermost position through a return stroke back to the upper limiting position. A main valve 34 controls the flow of pressurized air from the reservoir in the handle grip portion 22 to the upper end of the cylindrical chamber 32 to affect the driving movement of the piston 30 through its drive stroke.

The main valve 34 is pilot pressure operated and the pilot pressure chamber thereof is under the control of an actuating valve generally indicated at 36. The main valve 34 and actuating valve 36 maybe of known construction, an example of which is disclosed in commonly assigned U.S. Pat. No. 3,708,096, the disclosure of which is hereby incorporated by reference in its entirety into the present application. The construction and operation of the fastener driving mechanism 26 is disclosed in commonly assigned U.S. Pat. No. 5,263,842, which patent is hereby incorporated by reference in its entirety into the present application and this description will not be repeated in detail in the present application. The main features of the fastener driving mechanism 26 will be identified, however, so the present invention may be better understood. The fastener driving mechanism described herein is exemplary only and is not intended to be limiting. It is understood that the present invention can be used on a power operated fastener driving device having a fastener driving mechanism of any conventional construction and is not limited to the representative embodiment disclosed in the present application; it can also be understood that the present invention is not limited to pneumatically operated fastener driving devices and can be incorporated in fastener driving devices that are powered by any conventional power source including internal combustion powered devices and electromagnetically powered devices. The actuating valve 36 is actuated by a trigger mechanism, generally designated 37. The structure and operation of the trigger mechanism 37 is described in detail in the incorporated '842 patent reference and this description will not be repeated in detail in the present application. The structure and operation of the trigger mechanism is discussed below, however, when the operation of the device 10 is described.

Means are provided within the housing structure 16 to affect the return stroke of the piston 30. For example, such means may be in the form of a conventional plenum chamber return system such as that disclosed in the incorporated '096 United States patent reference.

A fastener driving element 38 is suitably connected to the piston 30 and is slidably mounted within the fastener driving track 28 formed in the nosepiece assembly 18. The fastener magazine assembly 14 is operable to receive a supply of fasteners 40 at a first end (not shown) and to feed the leading fastener out a second end 44 thereof through a lateral opening 46 (best seen in the cross-section of FIG. 2) in the nosepiece assembly 18 into the fastener driving track 28 to be driven therefrom by the fastener driving element 38 in a conventional manner.

Figure 2:
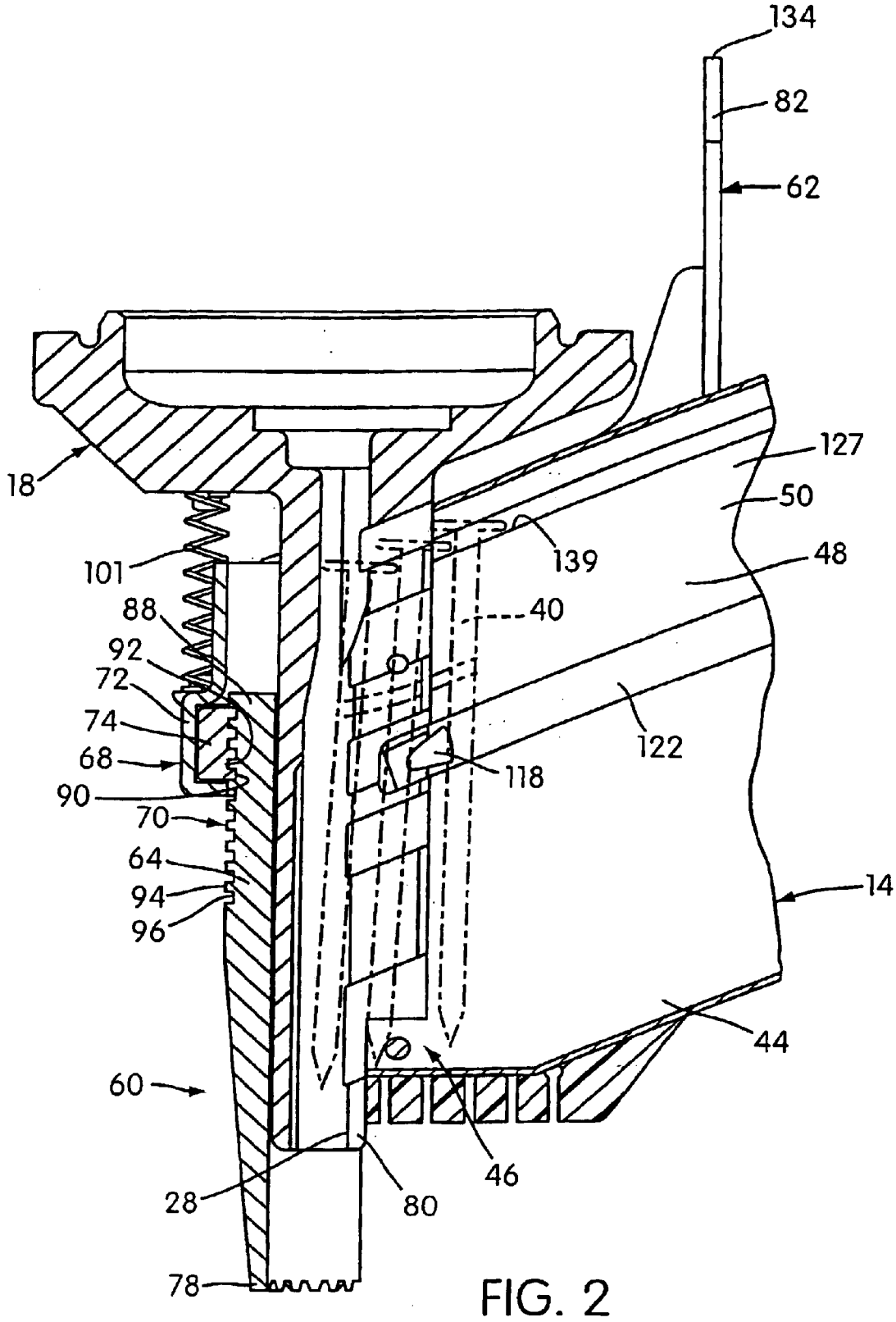
FIG. 2 is a cross-sectional view of a nosepiece assembly, a safety trip assembly and a fragment of a fastener magazine assembly of the fastener driving device and showing a plurality of [fastener] *fasteners* in phantom.
Figure 3:
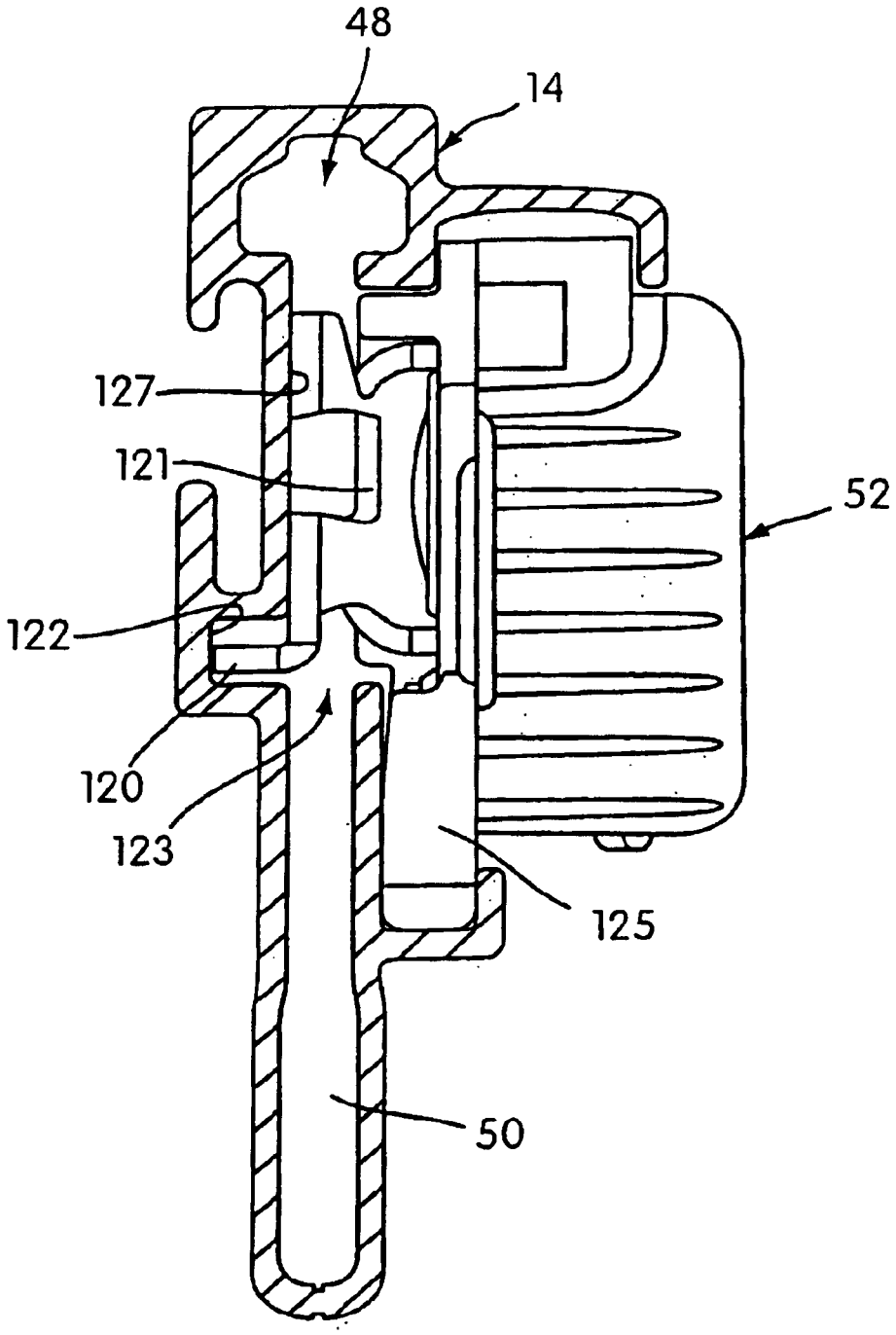
FIG. 3 is a cross-sectional view of the fastener magazine assembly taken through the line 3—3 in FIG. 1.
Figure 4:
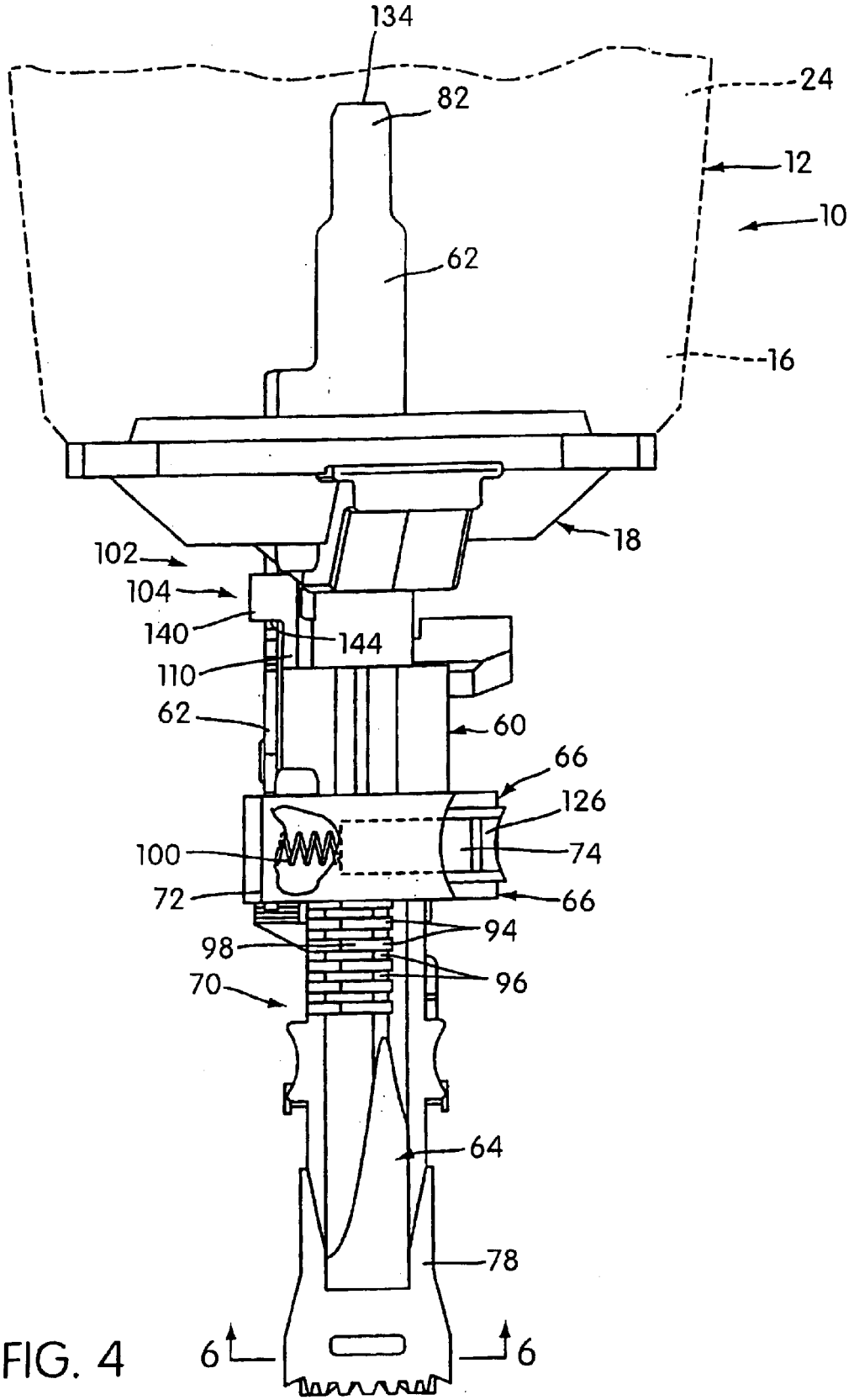
FIG. 4 is a front elevational view of the nosepiece assembly, the safety trip assembly and a trip locking mechanism constructed according to the principles of the present invention and showing a fragment of a housing structure of the fastener driving device in phantom.

The manner in which the fasteners 40 are supplied to the drive track 28 is conventional and is best appreciated from the cross-sectional view of FIG. 2 and the structure of the fastener magazine assembly 14 is best appreciated from the cross-sectional view of the same shown in FIG. 3.

The fastener magazine assembly 14 includes an inner portion 48 that defines a fastener supply channel 50 that is in communication with the lateral opening 46. The fastener magazine assembly 14 is constructed and arranged to hold a supply of fasteners 40 within the fastener supply channel 50 in an operative orientation for feeding the fasteners 40 from the fastener supply channel 50 through the lateral opening 46 and into the fastener driving track 28. A fastener feeding mechanism 52 is provided as part of the fastener magazine assembly 14. The fastener feeding mechanism 52 is spring biased in a conventional manner to move toward the second end of the magazine assembly so that when the mechanism 52 is positioned behind a supply of fasteners 40 disposed within the supply channel 50 the fastener feeding mechanism 52 biasingly engages the same to urge the fasteners 40 toward and into the fastener driving track 28 in a well known manner.

The present invention is not primarily concerned with the structure and operation of the fastener driving mechanism 26, with the structure of the housing assembly 12 or with the structure of the nosepiece assembly 18, all of which may be conventional. The focus of the present invention is, rather, the structure and operation of a safety trip assembly that acts as a safety to prevent the fastener driving mechanism 26 from being actuated until the nosepiece assembly 18 is pressed against a workpiece and the manner in which the safety trip assembly functions to control the depth to which a fastener is driven into the workpiece. The present invention is also directed to a trip lock mechanism that cooperates with the fastener magazine assembly 14, with the biased fastener feeding mechanism 52 and with the safety trip assembly to prevent the fastener driving mechanism 26 from being actuated when either 1) no or very few (typically 1 or 2) fasteners are loaded in the fastener magazine assembly 14 and the fastener feeding mechanism 52 is positioned at the second end 44 of the fastener mechanism assembly 14 in biasing engagement with the fasteners or 2) when the fastener magazine assembly 14 is removed from the housing assembly 12.

The structure of the safety trip assembly, generally designated 60, is best appreciated FIGS. 2 and 4–7. The safety trip assembly 60 includes a trigger enabling portion 62 and a workpiece engaging portion 64 that is releasably coupled to the trigger enabling portion 62 by a releasable coupling mechanism, generally indicated at 66. The safety trip assembly 60 is coupled to the housing assembly 12 for longitudinal movement with respect to the nosepiece assembly 18 between an extended position and a retracted position. When the safety trip assembly 60 is in the retracted position, the trigger enabling portion 62 conditions the trigger mechanism 37 and places it in an active state or condition so that manual movement of the trigger mechanism 37 thereafter through its actuation stroke will actuate the fastener driving mechanism 26. When the safety trip assembly 60 is in the extended position, the trigger enabling portion 62 disables the trigger mechanism 37 to prevent the fastener driving tool 10 from being accidentally actuated if the trigger mechanism is moved through its actuation stroke.

The releasable coupling mechanism 66 allows the workpiece engaging portion 64 to be uncoupled from the trigger enabling portion 62 to permit adjustment of the longitudinal length of safety trip assembly 60. The releasable coupling mechanism 66 includes a manually operable locking mechanism 68 that is carried by the trigger enabling portion and a fixed locking structure 70 that is formed on an exterior portion of the workpiece engaging portion 64 of the safety trip assembly 60.

The manually operable locking mechanism 68 includes a locking member mounting structure 72 that is rigidly attached to the trigger enabling portion 62 and a manually-operable, movable locking member 74 movably mounted in the locking member mounting structure 72 for movement with respect thereto between a locking position and a releasing position. The locking mounting structure 72 is positioned adjacent the fixed locking structure 70 on the workpiece engaging portion 64 so that when the movable locking member 74 is in its locking position, it engages the fixed locking structure 70 so that the movable locking member 74 and the fixed locking structure 70 are interlocked to prevent relative movement between the workpiece engaging portion 64 and the trigger enabling portion 62. When the movable locking member 74 is moved to its releasing position, the locking member 74 disengages from and releases the fixed locking structure 70 to permit relative movement between the workpiece engaging portion 64 and the trigger enabling portion 62 of the safety trip assembly 60. As will become apparent, the workpiece engaging portion 64 can be selectively repositioned with respect to the trigger enabling portion 62 of the safety trip assembly 60 to vary the depth to which a fastener is driven.

*As can be readily appreciated from the Figures, the locking member mounting structure 72 is illustrated in the form of a button guide and the locking member 74 is illustrated as a depressible button slidably mounted to the guide for movement with respect thereto between the locking and releasing positions.*

The manner in which the workpiece engaging portion 64 and the trigger enabling portion 62 of the safety trip assembly 60 are mounted on the nosepiece assembly 18 and the manner in which the movable locking member 74 is releasably engaged with the fixed locking structure 70 on the workpiece engaging portion 64 can best be appreciated from FIGS. 2, 6 and 7–8.

Figure 6:
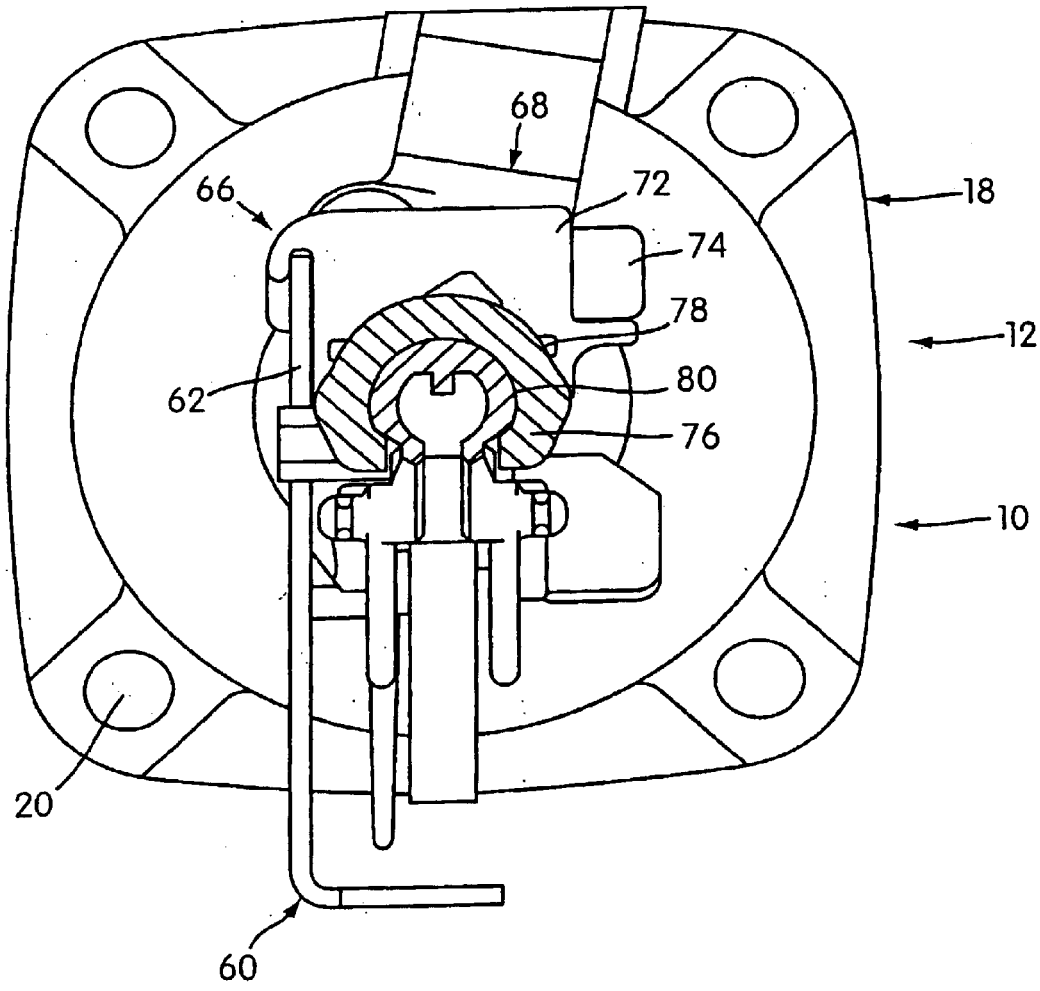
FIG. 6 is a cross-sectional view taken through the line 6—6 of FIG. 4.

The workpiece engaging portion 64 and the trigger enabling portion 62 of the safety trip assembly 60 are each internal structures preferably made of steel or other metal of suitable strength. As shown in FIG. 6, rearwardly extending wall structures 76 integrally formed on a distal end 76 of the workpiece engaging portion 64 partially surround a distal end portion 80 of the nosepiece assembly 18 to movably mount the workpiece engaging portion 64 of the safety trip assembly 60 on the nosepiece assembly 18 to allow longitudinal movement of the workpiece engaging portion 64 with respect to the nosepiece assembly 18 of the housing assembly 12.

The locking member mounting structure 72 is an integral structure preferably made of steel, although other metals of suitable strength could also be used in the construction. A proximal end 82 of the trigger enabling portions 62 is rigidly attached to the locking member mounting structure 72 and the locking member mounting structure 72 is in turn movably coupled to the nosepiece assembly 18 for limited movement in the longitudinal direction of the locking member mounting structure 72 with respect to the nosepiece assembly 18.

The manner in which the locking member mounting structure 72 is coupled to the nosepiece assembly 18 can be appreciated from [FIG. 6] *FIGS. 7 and 8*. More specifically, integral bracket structures 84 on the locking member mounting structure 72 are engaged with integral, longitudinally extending wall portions 86 formed on a central portion of the nosepiece assembly 18. A proximal end 88 of the workpiece engaging portion 64 extends between the locking member mounting structure 72 and the nosepiece assembly 18 in a position to engage the movable locking member 74.

The movable locking member 74 is an integral structure preferably made of steel, although a high strength molded plastic or other material of suitable strength could also be used in the construction. As best appreciated from FIGS. 2 and 7, the movable locking member 74 is provided with a series of continuous transversely extending teeth 90 and grooves 92 provided on angled, longitudinally extending wall portions 93, 95, respectively, of the locking member [mounting structure 72] *74* that engage similarly constructed integral transversely extending teeth 94 and grooves 96 formed on an angled, longitudinally extending wall structure 98 of the workpiece engaging portion 64. It can be appreciated that in the exemplary embodiment of the fastener driving tool 10 shown in the figures, the teeth and grooves 94, 96 on the workpiece engaging portion 64 of the safety trip assembly 60 constitute the fixed locking structure 70 thereof.

The teeth and grooves 90, 92 on the movable locking member are normally biased into releasable locking engagement with the teeth and grooves 94, 96 on the workpiece engaging portion 64 by a locking member biasing mechanism 100 which can be conventional coil spring as shown in FIGS. 7–8. The locking member biasing mechanism 100 biases the movable locking member 74 toward and into its locking position to prevent relative movement between the workpiece engaging portion 64 and the trigger enabling portion 62 of the safety tip assembly 60. The movable locking member 74 and the locking member biasing mechanism 100 are constructed and arranged to permit the user to move the movable locking member 74 manually against the biasing force of the locking member biasing mechanism 100 from the locking position to the releasing position and to allow the movable locking member 74 to return to its locking position under the biasing force when the user releases the movable locking member. As will become apparent, when the movable locking member 74 is in its releasing position, the workpiece engaging portion 64 can be moved longitudinally with respect to the trigger enabling portion 62 to adjust fastener drive depth.

The safety trip assembly 60 is normally biased toward and into its extended position by a conventional coil spring 101 that is mounted between the nosepiece assembly 18 and the locking member mounting structure 72 of the releasable coupling mechanism 66.

Figure 9:
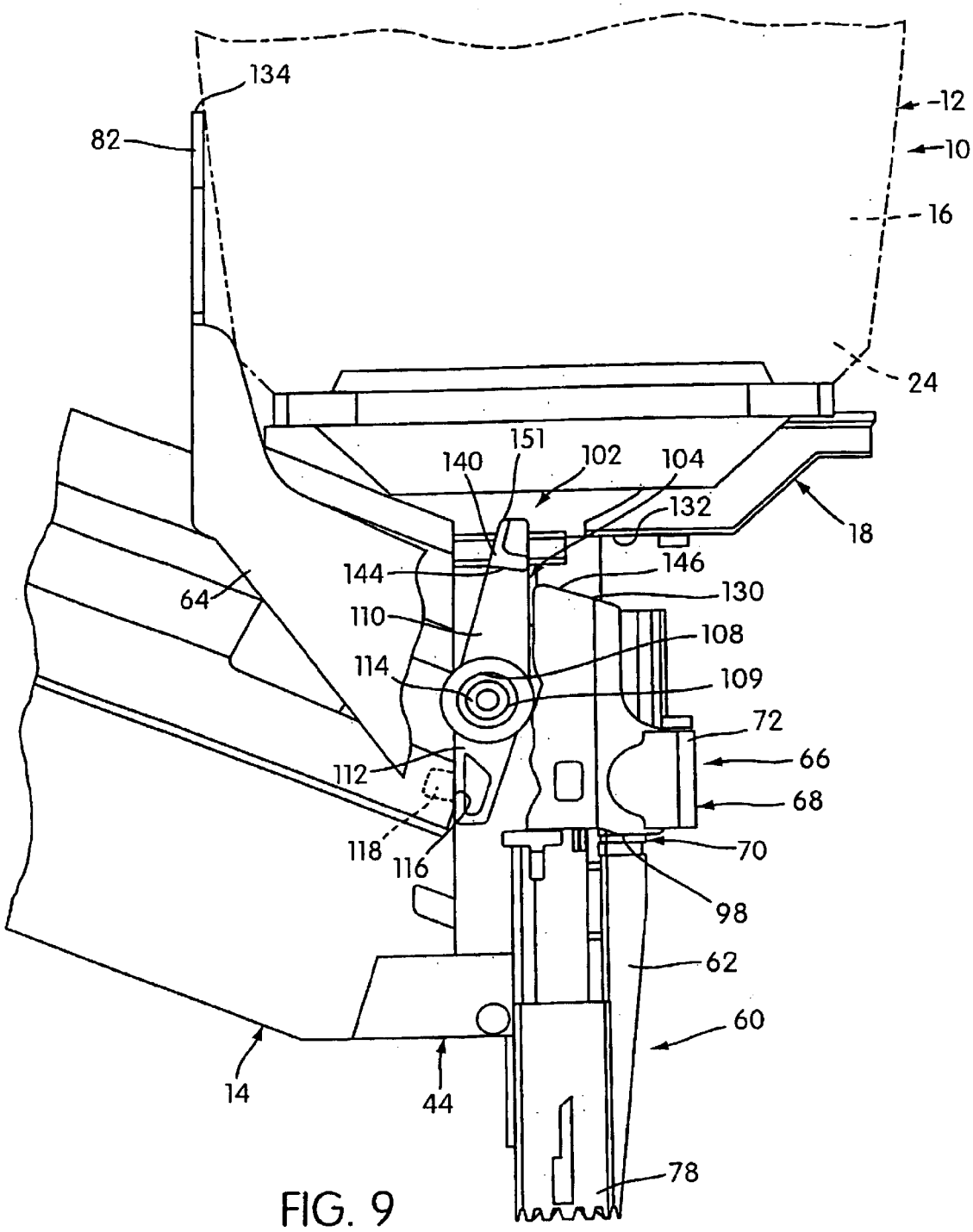
FIG. 9 is a view similar to FIG. 5 except showing the safety trip assembly in fragmentary view to reveal a trip locking mechanism constructed according to the principles of the present invention.

With reference to FIG. 9, the trip lock mechanism, generally designated 102, includes a movable trip lock member 104 and a trip lock biasing member 106 (best seen in FIGS. 12–13) operatively mounted to bias the trip lock member 104 toward and into a locking orientation. As best seen in FIG. 8, the trip lock member 104 is an elongated integral structure that has a bore 108 formed in a central portion 109 thereof and upper and lower arm member 110, 112, respectively extending outwardly in essentially opposite directions from the central portion 109.

When the trip lock member 104 is mounted on the nosepiece assembly 18, an outwardly extending cylindrical support structure 114 integrally formed on the nose piece assembly 18 extends through the bore 108 and the trip lock biasing member 106 is mounted on the support structure 114 between the trip lock member 140 and nosepiece assembly 18 and engages both 18, 104. It can be appreciated that the trip lock member 104 can be mounted to the nosepiece assembly 18 by any conventional means such as by a conventional bolt. The trip lock biasing member 106 biases the trip lock member 104 such that the same will tend to pivot in a clockwise direction with respect to the nosepiece assembly 18 from the point of view shown in FIGS. 9 and 11–13. The trip lock member 104 is pivotally mounted on the noisepiece assembly 18 for movement between a neutral orientation (shown, for example, in FIGS. 5 and 9) and at least one locking orientation with respect to the trigger enabling portion 62 of the safety trip assembly 60.

The trip lock mechanism 102 and the safety trip assembly 60 cooperate to: (1) permit the safety trip assembly 60 to be moved from the extended position to the retracted position when the movable trip lock member 104 is in the neutral orientation to thereby permit the trigger mechanism 37 to be placed in an active condition so the device can be actuated by the user and (2) prevent the safety trip assembly 60 from being moved from the extended position to the retracted position when the movable trip lock member 104 is in a locking orientation to thereby prevent the trigger mechanism 37 from being placed in an active state or condition to prevent the fastener driving mechanism from being actuated even if the trigger mechanism is moved through its actuation stroke.

The fastener magazine assembly 14 and the fastener driving mechanism 26 cooperate to control the orientation *of* the trip lock member 104. A section of the trigger enabling portion 62 of the safety trip assembly 60 has been broken away in FIG. 9 to [shown] *show* the engagement between the trip lock mechanism 102 and a forward edge 116 of the fastener magazine assembly 14.

Figure 13:
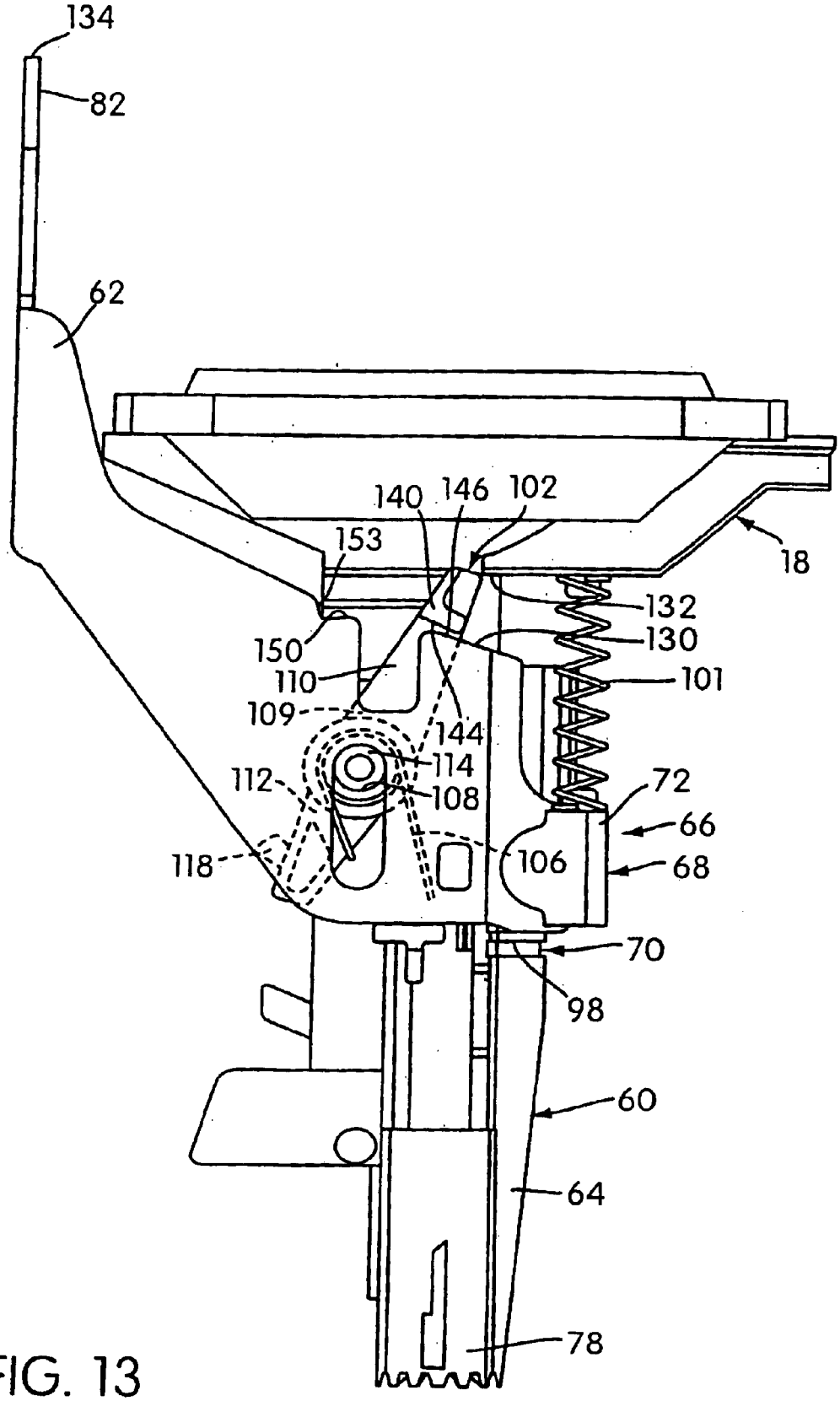
FIG. 13 is a view similar to FIG. 13 except not showing the fastener magazine assembly and showing the trip locking mechanism in a forward locking orientation.

When the fastener magazine assembly 14 is mounted on the housing assembly 12 and the fastener feeding mechanism 52 is in a position rearward of its forward most stopped position, the forward edge 116 of the assembly 14 engages and is in abuting contact with the lower arm member 112 of the trip lock member 104 to maintain the same in its neutral orientation against the spring force provided by the biasing member 106. When the fastener magazine assembly 14 is removed from the housing assembly 12, the trip lock member 104 is allowed to move in a clockwise direction (as shown in FIG. 13) out of the neutral orientation to a first or forward locking orientation shown in FIG. 13.

Figure 12:
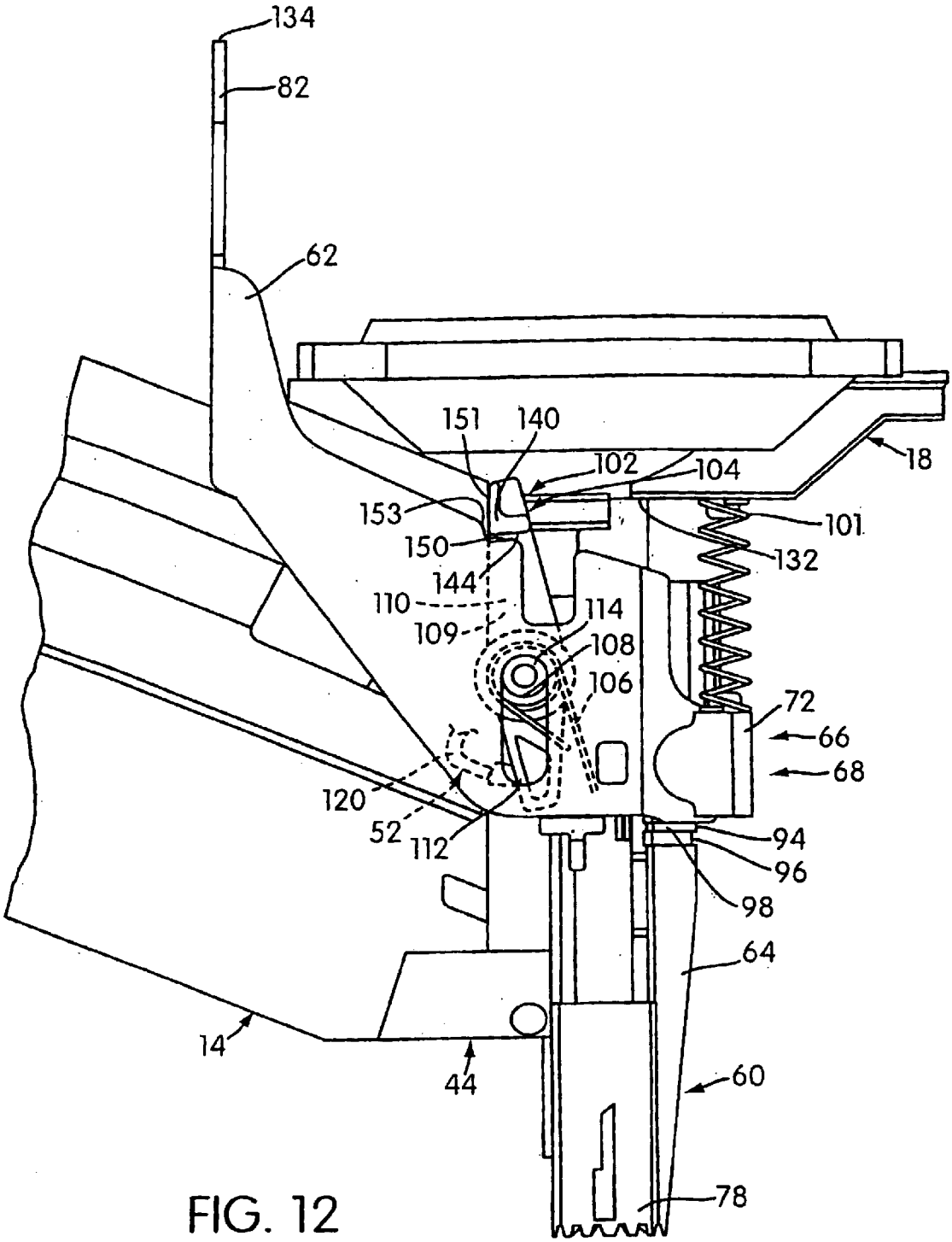
FIG. 12 is a view similar to FIG. 5 except showing the trip locking mechanism in a rearward locking orientation and shown portions of the trip locking mechanism, a fragment of the fastener feeding mechanism and portions of a biasing member in phantom.

When the fastener magazine assembly 14 is mounted on the housing assembly 12 and the fastener magazine assembly 14 contains no or very few fasteners so that the fastener feeding mechanism 52 is allowed to move into or almost into its fully forward, stopped position, the trip lock member 104 is moved in a counterclockwise direction out of the neutral orientation toward and into a second or rearward locking orientation as shown, for example, in FIG. 12.

Movement of the trip lock member 104 out of its neutral orientation into its rearward locking orientation is caused by engagement between a rearwardly extending structure 118 integrally formed on the lower arm member 112 of the trip lock member 104 and an outwardly extending leg structure 120 rigidly attached to the fastener feeding mechanism 52 (best seen in the cross-sectional view of FIG. 3). A laterally extending channel 122 that extends the length of the fastener magazine assembly 14 is provided therein in communication with the channel 50 to receive the leg structure 120.

As the fastener feeding mechanism 52 moves into its fully forward, stopped position, the leg structure 120 abutingly engages the rearwardly extending structure 118 on the trip lock member 104 and forward movement of the fastener feeding mechanism 52 thereafter toward its fully forward position causes the pivotal movement of the fastener feeding mechanism 52 from its neutral orientation into its rearward locking orientation.

Operation

The releasable coupling mechanism 66 of the safety trip assembly 60 can be manually adjusted simply and easily without the use of hand tools to control the depth to which the fastener driving device 10 drives a fastener into a workpiece by moving the workpiece engaging portion 64 of the safety trip assembly 60 relative to the trigger enabling portion 62 thereof. To adjust the safety trip assembly 60, the user (with the fastener driving tool 10 preferably disconnected from a source of pressurized air to assure user safety) presses an end portion 126 of the movable locking member 74 with a thumb or finger to move the member 74 from its locking position to its releasing position. While manually holding the movable locking member 74 in its releasing position, the user moves the workpiece engaging portion 64 of the safety trip assembly 60 toward or away from the trigger enabling portion 62 thereof. When the workpiece engaging portion 64 is in the desired position relative to the trigger enabling portion 62, the user releases the movable locking member 74 and allows the locking member biasing mechanism 100 to automatically move the movable locking member 74 toward its locking position. It can be understood that the workpiece engaging portion 64 may have to be moved slightly toward or away from the trigger enabling portion 62 to allow the transversely extending teeth 90 and grooves 92 on the movable locking member 74 to align with the transversely extending teeth 94 and grooves 96 on the workpiece engaging portion 64. It can be appreciated, therefore, that the teeth and grooves 90, 92, 94, 96 cooperate to define a plurality of operative or indexed locking positions of the workpiece engaging portion 64 with respect to the trigger enabling portion 62.

The workpiece engaging portion 64 may optionally be provided with a series of numbered, transversely extending measuring lines that can be aligned with suitable pointing structure on the locking member mounting structure 72 to indicate to the user the depth to which the nail will be driven with respect to the top surface of the workpiece.

The operation of the device 10 to drive a nail is entirely conventional and will be known to those skilled in the art, but will be discussed briefly to help illustrate the operation of the releasable coupling mechanism 66 of the safety trip assembly 60 and the trip lock member 104.

To drive a fastener into a workpiece, the fasteners are first loaded into the fastener magazine assembly 14 in a conventional manner. More specifically, fasteners in, for example, conventional stick form are inserted in the fastener feeding channel 50 from the first end 42 of the magazine behind the fastener feeding mechanism 52. The fastener feeding mechanism 52 is then pulled rearwardly within the magazine toward the first end 42 until it is positioned behind the supply of fasteners 40. With reference to FIG. 3, it can be understood that the fastener feeding mechanism 52 is provided with a feeder mechanism blade 121 and that the blade 121 and leg structure 120 are integral parts of a single pivotable fastener engaging and pushing structure, generally designated 123, that is preferably made of metal and is pivotally mounted on a body portion 125 (preferably made of plastic) of the fastener feeding mechanism 52. The pivotable pushing and engaging structure 123 is spring biased in a conventional manner in a generally transverse direction toward a longitudinally extending wall portion 127 of the fastener magazine assembly but can be pivoted against the spring bias toward the body portion of the fastener feeding mechanism 52 to allow the fastener feeding mechanism 52 to be pulled rearwardly past a package of fasteners 40 in the magazine assembly in a conventional manner to allow the fastener feeding mechanism 52 to be positioned rearwardly of the fasteners while the magazine is being loaded.

When the fastener magazine assembly 14 is loaded, a supply of fasteners is disposed within the fastener supply channel 50 and the fastener feeding mechanism 52 is positioned behind the supply of fasteners to push the same toward the fastener driving track 28. The fastener driving tool 10 is then connected to a source of pressurized air.

The user, holding the tool 10 by the handle grip portion 22 places the workpiece engaging portion 64 of the safety tip assembly 60 on the workpiece at the location where the fastener is to be driven. The user pushes the housing assembly 12 toward the workpiece which causes the safety trip assembly 60 to move from its extended position against the spring bias of the coil spring 101 to its retracted position. The retracted position is realized when an edge portion 130 of the trigger enabling portion 62 contacts and is stopped against a surface 132 on the nosepiece assembly 18. As the trigger enabling portion 62 moves into its retracted position, a free end 134 thereof moves a lever arm 136 pivotally mounted on a trigger member 138 of the trigger mechanism 37 to place the trigger mechanism 37 in an activated condition so that pivotal movement of the trigger member 138 by the user thereafter will depress a valve stem 141 on the actuating valve 36 to actuate the fastener driving mechanism 26 to drive the leading fastener.

It can be appreciated that the fastener driving element 38 is normally in its raised position which allows the leading fastener in the fastener magazine assembly 14 to move through the lateral opening in the nosepiece assembly into the fastener driving track 28. It can also be understood that prior to actuating the fastener driving element 38, the head of the second fastener immediately adjacent the leading fastener is supported by surfaces 139 in the magazine assembly while the head of the leading fastener is unsupported within the fastener driving track 28.

The downward movement of the piston 30 through its drive stroke carries the fastener driving element 38 to its lowermost position. When the fastener driving element 38 is in its lowermost position, the distal end thereof typically extends slightly out of the drive track so the distal driving surface of the driving element 38 is positioned about one quarter inch (typically) beyond the end of the drive track 28 and this defines the point at which the fastener driving element 38 stops driving the fastener 40 toward and into the workpiece. One skilled in the art will understand that the driving element 38 extends beyond the end of the track 28 to compensate for a reaction force that occurs during actuation which tends to move the housing assembly and associated structures away from the workpiece and to provide the ability to countersink the fastener if desired. It will be understood that the distance between the end of the nosepiece assembly 18 (which defines the distal end of the drive track 28) and the surface of the workpiece determines the depth to which a fastener is driven into the workpiece and that the position of the workpiece engaging portion 64 relative to the trigger enabling portion 62 determines this distance.

Figure 10:
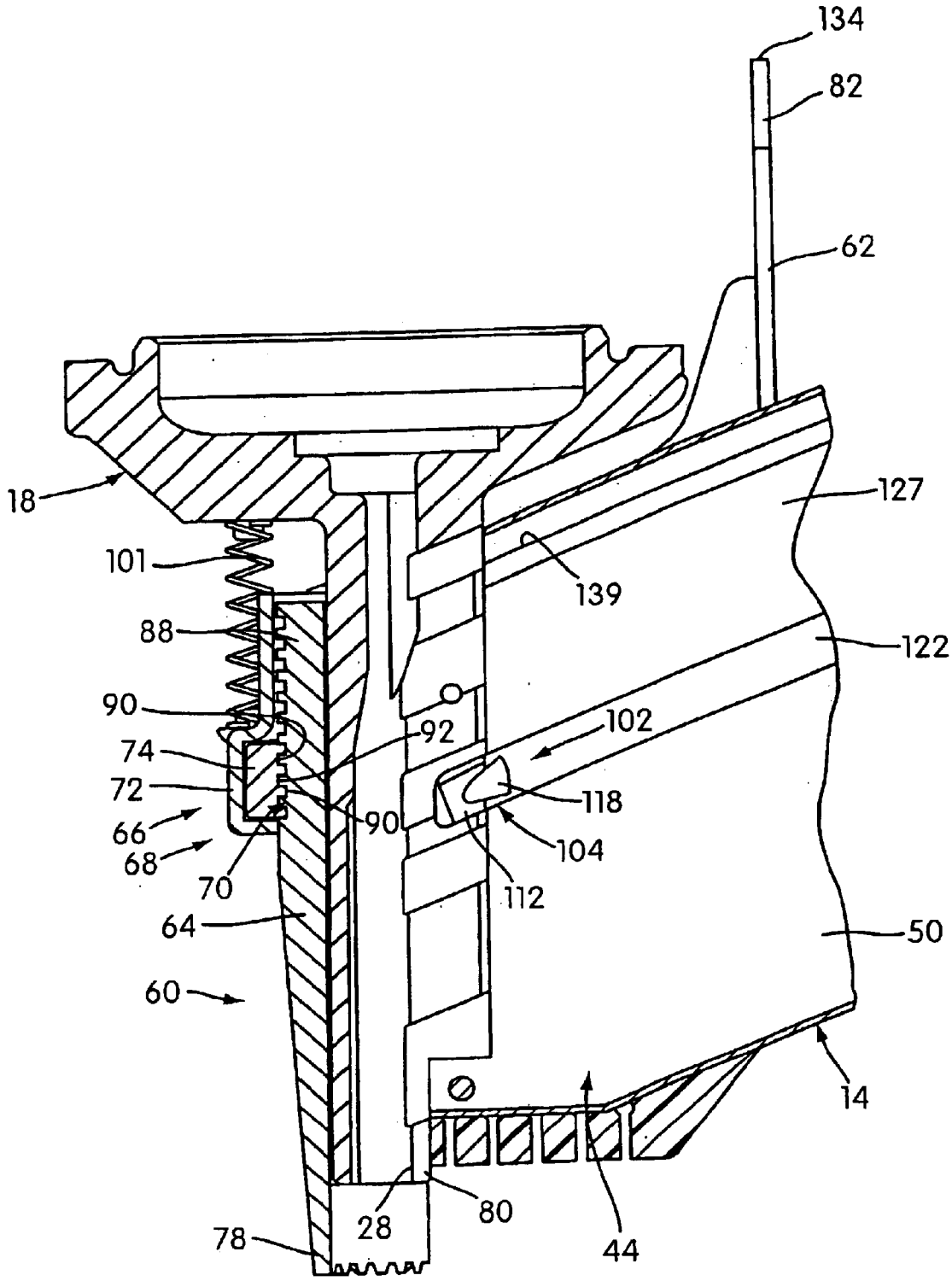
FIG. 10 is a view similar to FIG. 2 showing a workpiece engaging portion of the safety trip assembly in an adjusted operating position with respect to a trigger enabling portion in which the workpiece engaging portion is relatively close to the trigger enabling portion.

More specifically, the workpiece engaging portion 64 can be adjusted by appropriate manipulation of the releasable coupling mechanism 66 to position the end of the drive track 28 against the workpiece when the safety trip assembly 60 is in the retracted position to drive the fastener so that is it flush (or counter sunk, depending on the nature of the material of the workpiece) or can be moved outwardly from the trigger enabling portion 62 into any one of a multiplicity of adjusted operating positions to hold the end of the drive track 28 in spaced relation to the workpiece surface to partially drive the nail into the workpiece a desired predetermined distance. FIGS. 2 and 10 show, for example, two positions of the workpiece engaging portion 64 with respect to the trigger enabling portion 62.

Figure 5:
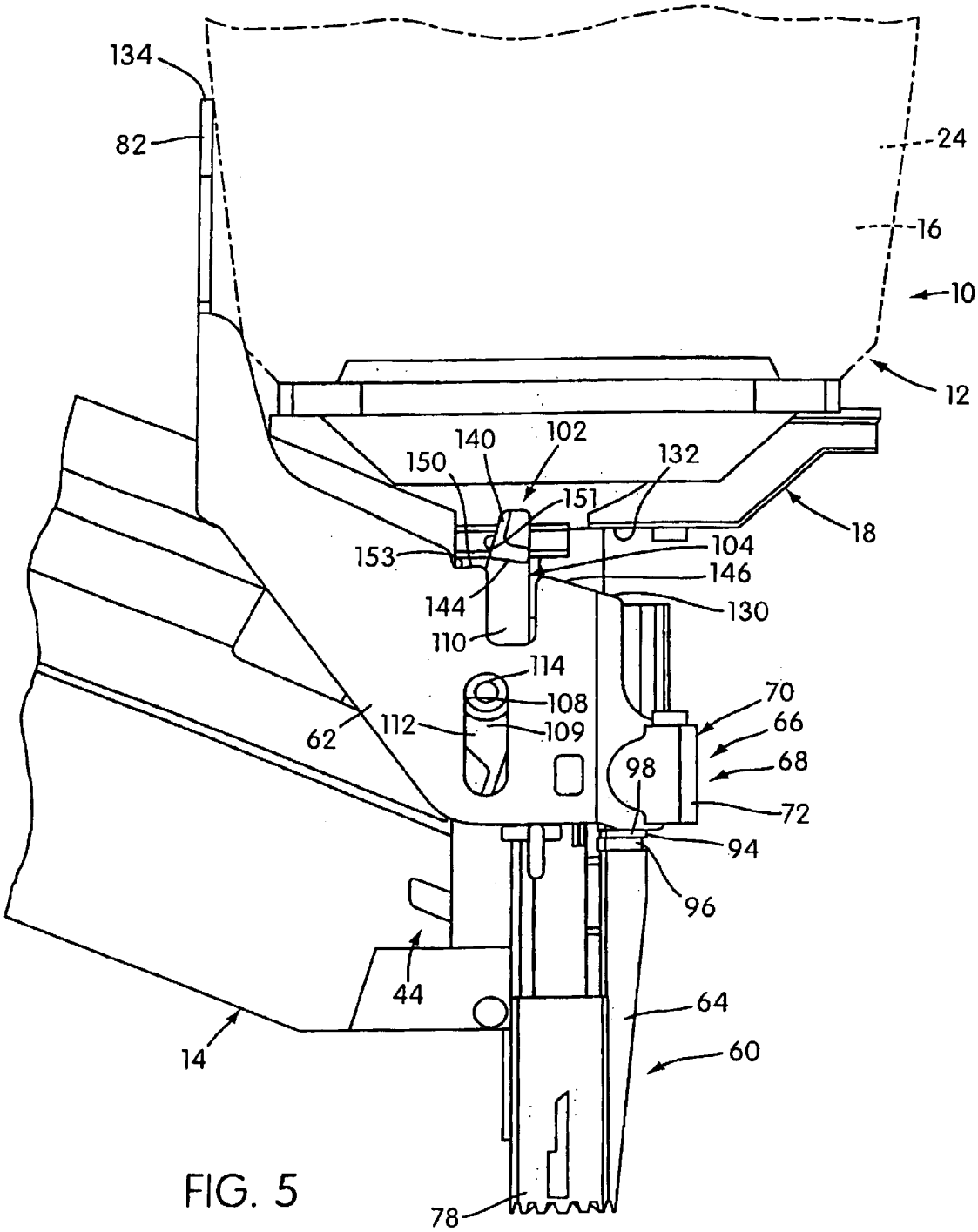
FIG. 5 is a side elevational view of the fastener driving device similar to the view of FIG. 1 except showing an opposite side of the device and showing a fragmentary of the housing structure in phantom.
Figure 11:
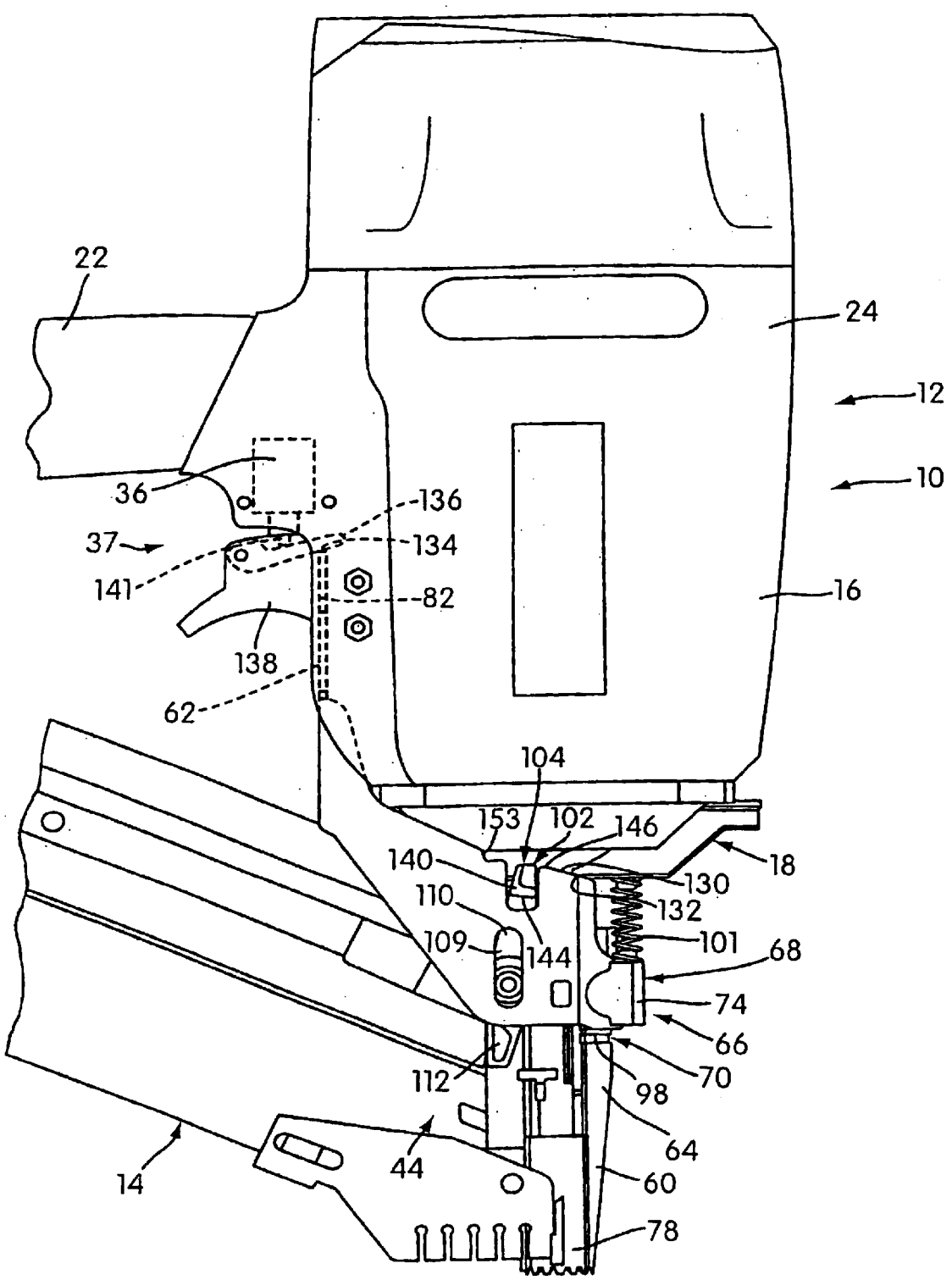
FIG. 11 a side elevational view similar to FIG. 1 except showing the opposite side of the fastener driving device and showing the safety trip assembly in a retracted position with respect to a housing assembly of the device.

The operation of the trip lock member 104 can be understood with reference to FIGS. 5, 9, 11–13. When the fastener magazine assembly 14 is mounted on the housing assembly and the magazine is loaded with fasteners, the trip lock member 104 allows the movement of the trigger enabling portion 62 of the safety trip assembly 60 from the extended to the retracted positions. It can be appreciated from FIG. 4 that a locking structure 140 is integrally formed on the upper arm member 110 of the trip lock member 104 and that the locking structure 140 extends transversely outwardly therefrom in generally overlying relation to the trigger enabling portion 62 of the safety trip assembly 60. When the trip lock member 104 is in its neutral orientation as shown in FIG. 5, the locking structure 140 does not interfere with the movement of the safety trip assembly 60 from its extended position to its retracted position because the locking structure 140 is aligned with a groove 142 formed in the trigger enabling portion 62 and received therein when the safety trip assembly 60 is retracted as shown in FIG. 11. It can therefore be appreciated that when the fastener magazine assembly 14 is on the housing assembly 12 and the fastener feeding mechanism 52 is disposed rearwardly of a supply of fasteners 40 in the assembly 14, the trip lock member 104 does not restrict the movement of the safety trip assembly 60 into its retracted position so that the same is allowed to condition the trigger mechanism 37 to actuate the fastener driving mechanism 26 to drive a fastener.

It can be appreciated from FIG. 13, however, that when the fastener magazine assembly 14 is removed so that the trip lock member 104 is in the forward locking orientation, a downwardly facing surface 144 on the locking structure 140 on the trip lock member 104 is in overlying blocking relation to a first locking edge portion 146 on the trigger enabling portion 62. Movement of the safety trip assembly 60 thereafter toward its retracted position results in contact between the surface 144 and edge 146 and this locking engagement prevents the safety tip assembly 60 from moving upwardly a sufficient distance toward its retracted position to place the trigger mechanism 37 in an activated condition. Therefore, the fastener driving mechanism 26 cannot be actuated even if the trigger mechanism 37 is manually moved upwardly through its full stroke.

It can be understood from FIG. 13 that the locking edge 146 on the trigger enabling portion 62 is angled forwardly and downwardly so that the upward rectilinear movement of the safety trip assembly 60 tends to urge the trip lock member to pivot toward its forward locking orientation. Thus the upward movement of the safety trip assembly 60 does not pivot the trip lock member 104 back toward its neutral orientation.

When the fastener magazine assembly 14 is out of or almost out of fasteners and the fastener feeding mechanism 52 is in or approximately in its fully forward stopped position, which in turn causes the movement of the trip lock member 104 to its rearward locking orientation as described above, the downwardly facing surface 144 is in overlying relation with a second locking edge portion 150 of the trigger enabling portion 62 so that movement of the safety trip assembly 60 toward its retracted position thereafter causes the second locking edge 150 to abut against the downwardly facing surface 144 which prevents the trigger mechanism 37 from being placed in an active condition. Pivotal movement of the trip lock member 104 toward its rearward locking position stops when a rearwardly facing surface 151 abuts a forwardly and downwardly angled edge 153 of the trigger enabling portion 62 as best seen in FIG. 12.

It can be understood that the embodiment of the fastener driving tool 10 shown and described is exemplary only and not intended to limit the scope of the invention. It will be understood, for example, that the trigger mechanism 37 and the safety trip assembly 60 cooperate to actuate the actuating valve 36 and begin the drive cycle regardless of whether the safety trip assembly 60 is moved to its retracted position first and the trigger member is moved rearwardly to its actuated position thereafter or whether the trigger member is moved rearwardly to its actuated position and then the safety trip assembly 60 is moved to its retracted position thereafter. It can be understood that it is within the scope of the present invention to provide a manual actuating mechanism that incorporates the releasable coupling mechanism 66 and/or the trip lock member 104 that requires a particular sequence of movements as, for example, an initial movement of the safety trip assembly 60 into its operative position and then the digital movement of the trigger member to its actuated position.

One skilled in the art will understand that a releasable coupling mechanism constructed according to the principles of the present invention can be incorporated into a wide range of safety trip assemblies that can be used on a wide range of power operated fastener driving devices.

It can also be appreciated that the type of fastener driven by the tool 10 and the size thereof can vary widely. It is also understood that the manner in which the fasteners are releasably secured to one another is entirely conventional. The fasteners 40 shown are flathead nails that are packaged in straight stick form and may be of the type which include notched heads enabling the shanks of the nails to be disposed in a shank-to-shank abutting stick and secured thereto by a pair of wires suitably welded to one side of the shanks. It will be understood that the invention has wide applicability to power operated fastener driving devices that include straight magazines and pushers or other conventional feeding mechanisms that are movably mounted within the magazine. It will also be understood that while the present device is particularly useful in large size pneumatic fastener driving devices, the invention can be applied to devices where fastener drivers are of a lesser size. It can also be understood that the invention is not restricted to pneumatically powered devices and can be included in other power operated devices of the fluid pressure operated type including those powered by internal combustion. The driver may also be driven electromagnetically in other embodiments of the invention.

What is claimed is:

1. A fastener driving tool for driving fasteners into a workpiece, comprising:

a housing assembly including a nosepiece assembly defining a longitudinally-extending fastener drive track;

a fastener driving mechanism carried internally of said housing assembly and constructed and arranged to drive a fastener through said fastener drive track and into a workpiece when said fastener drive mechanism is selectively activated by a user, a manually actuable trigger mechanism constructed and arranged to activate said fastener driving mechanism when manually actuated by a user; and a safety trip assembly coupled to said housing assembly for longitudinal movement with respect to said noisepiece assembly and including a trigger enabling portion and a workpiece engaging portion releasably coupled to said trigger enabling portion, said safety trip assembly being constructed and arranged to be movable between an extended position and a retracted position whereby said trigger enabling portion enables said trigger mechanism to activate said fastener driving mechanism when manually actuated by a user when said safety trip assembly is in said retracted position and disables said trigger mechanism when said safety trip assembly is not in said retracted position, said safety trip assembly being constructed and arrange to be biased toward said extended position and to be moved toward said retracted position by engaging a longitudinal end of said workpiece engaging portion with a surface of a workpiece and pressing said housing toward the workpiece, thereby moving said safety trip assembly against said bias with respect to said nosepiece assembly and said body, wherein said workpiece engaging portion is constructed and arranged to be movable with respect to said trigger enabling portion when said workpiece engaging portion is uncoupled from said trigger enabling portion to permit adjustment of a longitudinal length of said safety trip assembly, and wherein said safety trip assembly includes a releasable coupling mechanism for releasably coupling said trigger enabling portion to said workpiece engaging portion, said releasable coupling mechanism comprising:

fixed locking structure formed on an exterior portion of said workpiece engaging portion;

a manually operable locking mechanism carried by said trigger enabling portion and including a locking member mounting structure attached to said trigger enabling portion adjacent said fixed locking structure formed on said workpiece engaging portion and a manually-operable, movable locking member mounted on said locking member mounting structure so as to be movable with respect thereto between a locking position and a releasing position, said movable locking member being constructed and arranged to engage said fixed locking structure when said movable locking member is in said locking position to interlock said movable locking member and said fixed locking structure to thereby prevent relative movement between said workpiece engaging portion and said trigger enabling portion and to disengage from said fixed locking structure when said movable locking member is in said releasing position to thereby permit relative movement between said workpiece engaging portion and said trigger enabling portion; and a locking member biasing mechanism constructed and arranged to generate a biasing force to urge said movable locking member into said locking position, said movable locking member and said locking member biasing mechanism being constructed and arranged to permit said movable locking member to be manually moved against said biasing force by a user's hand engaging said movable locking member to move said movable locking member from said locking position to said releasing position and to permit said movable locking member to automatically return to said locking position when said movable locking member is disengaged by the user's hand.

2. A fastener driving tool according to claim 1 wherein said workpiece engaging portion further comprises rearwardly extending wall structures integrally formed on a distal end of said workpiece engaging portion and surrounding at least a portion of a distal end portion of said nosepiece assembly, such that said workpiece engaging portion is movably mounted on said nosepiece assembly so as to allow longitudinal movement of said workpiece engaging portion with respect to said nosepiece assembly.

3. A fastener driving tool according to claim 1 wherein said locking member mounting structure is rigidly attached to a proximal end of said trigger enabling portion and is movably coupled to said nosepiece assembly for limited movement in a longitudinal direction of said locking member mounting structure with respect to said nosepiece assembly.

4. A fastener driving tool according to claim 1 wherein said locking member mounting structure is an integral metallic structure.

5. A fastener driving tool according to claim 1 wherein said movable locking member further comprises:

a series of transversely extending teeth and grooves provided on angled, longitudinally extending wall portions of said locking member [mounting structure] constructed and arranged to engage transversely extending teeth and grooves formed on an angled, longitudinally extending wall structure of said workpiece engaging portion.

6. A fastener driving tool according to claim 1 wherein said locking member biasing mechanism further comprises a spring.

7. A fastener driving tool according to claim 1 wherein said workpiece engaging portion is constructed and arranged to be moved longitudinally with respect to said trigger enabling portion to adjust a depth of fastener drive.

8. A fastener driving tool for driving fasteners into a workpiece, comprising:

a housing assembly including a nosepiece assembly defining a longitudinally-extending fastener drive track;

a fastener magazine assembly releasably attached to said housing assembly in an operative manner with respect to a lateral opening formed in said housing assembly and communicating with said fastener drive track, said magazine assembly including an inner portion defining a fastener supply channel communicating with said lateral opening, said fastener magazine assembly being constructed and arranged to hold a supply of fasteners within said fastener supply channel in an operative orientation for feeding fasteners from said fastener supply channel through said lateral opening and into said fastener drive track, said fastener magazine assembly further comprising a biased fastener feeding mechanism constructed and arranged to be positioned behind a supply of fasteners disposed within said fastener supply channel and to urge the supply of fasteners through said fastener supply channel and toward said lateral opening and said fastener drive track;

a fastener driving mechanism carried internally of said housing assembly and constructed and arranged to drive a fastener through said fastener drive track and into a workpiece when said fastener drive mechanism is selectively activated by a user;

a manually actuable trigger mechanism constructed and arranged to activate said fastener driving mechanism when manually actuated by a user;

a safety trip assembly coupled to said housing assembly for longitudinal movement with respect to said nosepiece assembly, said safety trip assembly being constructed and arranged to be movable between an extended position and a retracted position whereby said safety trip assembly enables said trigger mechanism to activate said fastener driving mechanism when manufactually actuated by a user when said safety trip assembly is in said retracted position and disables said trigger mechanism when said safety trip assembly is not in said retracted position, said safety trip assembly being constructed and arranged to be biased toward said extended position and to be moved toward said retracted position by engaging a longitudinal end of said safety trip assembly with a surface of a workpiece and pressing said housing assembly toward the workpiece, thereby moving said safety trip assembly against said bias with respect to said nosepiece assembly and said body; and a trip lock mechanism including a movable trip lock member carried on said nosepiece assembly so as to be movable between a neutral orientation and a locking orientation, said trip lock mechanism and said safety trip assembly being constructed and arranged to (1) permit said safety trip assembly to be moved from said extended position to said retracted position when said movable trip lock member is in said neutral orientation to thereby permit said trigger mechanism to be activated and (2) prevent said safety trip assembly from being moved from said extended position to said retracted position when said movable trip lock member is in said locking orientation to thereby prevent said trigger mechanism from being activated, wherein said trip lock mechanism includes a biasing member constructed and arranged to generate a biasing force to urge said movable trip lock member toward said locking orientation, wherein said fastener magazine assembly is constructed and arranged to engage said trip lock mechanism when said fastener magazine assembly is attached to said housing assembly to move said trip lock member against said biasing force to said neutral orientation and wherein said trip lock member is constructed and arranged to move to said locking orientation under said biasing force when said fastener magazine assembly is removed from said housing to prevent said trigger mechanism from being activated when said fastener magazine assembly is removed from said housing assembly, wherein said fastener mechanism is constructed and arranged to engage said trip lock mechanism when said fastener supply channel is empty to move said fastener lock member from said neutral orientation to said locking orientation to prevent said trigger mechanism from being activated when said fastener supply channel is empty.

9. A fastener driving tool according to claim 8 wherein said safety trip assembly includes a workpiece engaging portion which extends beyond said nosepiece assembly when said safety trip assembly is in the extended position thereof so as to be moved by contact with a workpiece to move said safety trip assembly into the retracted position thereof and a trigger enabling portion disposed in operative relation to said trigger mechanism, said workpiece engaging portion and said trigger enabling portion being fixed together so as to move together as a unitary structure.

10. A fastener driving tool according to claim 9 wherein said workpiece engaging portion and said trigger enabling portion are fixedly interconnected by a releasable coupling mechanism constructed and arranged to permit adjustment of the longitudinal length of the unitary structure provided by said portions to thereby adjust the depth a fastener is driven into a workpiece.

11. A fastener driving tool according to claim 9 wherein said trip lock member is mounted on said nosepiece assembly so as to be biased by said biasing member into a forward locking orientation, the mounting of said trip lock member enabling the same to be moved into a central neutral orientation against the bias of said biasing member and beyond that into a rearward locking orientation, said magazine assembly including lock moving structure constructed and arranged to move said trip lock member from said forward locking orientation into said neutral orientation when said fastener magazine assembly is attached to said housing assembly, said fastener feeding mechanism including lock moving structure constructed and arranged to move said trip lock member from said neutral orientation into said rearward locking orientation when said fastener supply channel is empty.

12. A fastener driving tool according to claim 11 wherein said trip lock member is provided to said nosepiece assembly and includes an upwardly extending arm having a fixed lock structure extending from an upper end thereof, the unitary structure provide by said workpiece engaging portion and said trigger enabling portion having interengaging structure positioned and configured to cooperate with said upper arm lock structure so as to permit movement of said contact trip assembly from the extended position thereof into the retracted position thereof when said trip lock member is in the neutral orientation thereof and to interengage with said upper arm lock structure to prevent movement of the contact trip assembly from the extended position thereof into the retracted position thereof when said trip lock member is either in said forward locking orientation or in said rearward locking orientation.

13. A fastener driving local according to claim 12 wherein said trip lock member includes a downwardly extending arm having interengaging structure thereon constructed and arranged to be engaged by the lock moving structure of said fastener magazine assembly and the lock moving structures of said fastener feeding mechanism.

*14. A fastener driving tool for driving fasteners into a workpiece, comprising:*

*a housing assembly including a nosepiece assembly defining a longitudinally-extending fastener drive track;*

*a fastener driving mechanism carried internally of said housing assembly and constructed and arranged to drive a fastener through said fastener drive track and into a workpiece when said fastener driving mechanism is selectively activated by user;*

*a manually actuatable trigger mechanism constructed and arranged to activate said fastener driving mechanism when manually actuated by a user;*

*a safety trip assembly including a trigger enabling portion and a workpiece engaging portion slidably mounted to said trigger enabling portion for movement in a longitudinal direction with respect to said trigger enabling portion;*

*a manually-operable, movable lock mounted to said trigger enabling portion for movement between a locking position and a releasing position, said movable lock in said locking position thereof engaging said workpiece engaging portion to releasably couple said workpiece engaging portion to said trigger enabling portion and thereby fix a longitudinal length of said safety trip assembly, said movable lock in said releasing position thereof being disengaged from said workpiece engaging portion to enable said workpiece engaging portion to be slid in the longitudinal direction with respect to said trigger enabling portion for adjusting the longitudinal length of the safety trip assembly;*

*said safety trip assembly being movable when said workpiece engaging portion is releasably coupled to said trigger enabling portion by said lock between an extended position and a retracted position whereby said trigger enabling portion enables said trigger mechanism to activate said fastener driving mechanism when manually actuated by a user when said safety trip assembly is in said retracted position and disables said trigger mechanism when said safety trip assembly is not in said retracted position, said safety trip assembly being biased toward said extended position and movable toward said retracted position by engaging said workpiece engaging portion with a surface of a workpiece and pressing said housing assembly toward the workpiece; and*

*a spring positioned adjacent the movable lock to bias said movable lock into said locking position, and spring permitting said movable lock to be manually moved to said releasing position against the bias thereof by a user's hand engaging said movable lock to move said movable lock from said locking position to said releasing position and to automatically return said movable lock to said locking position when said lock is disengaged by the user's hand.*

*15. A fastener driving tool according to claim 14, wherein said spring is a coil spring.*

*16. A fastener driving tool according to claim 15, wherein said movable lock is mounted to said trigger enabling*

*portion for transverse movement relative to the longitudinal direction between the locking and releasing positions thereof and wherein said spring is positioned to bias said lock transversely to said locking position thereof.*

*17. A fastener driving tool according to claim 16, further comprising a button guide provided on said trigger enabling portion, said lock being a depressible button slidably mounted to said guide so as to be movable with respect thereto between said locking and releasing positions thereof.*

*18. A fastener driving tool according to claim 17, wherein said spring is mounted in compression between said button and a portion of said button guide so as to bias said button into said locking position.*

*19. A fastener driving tool according to claim 18, wherein said workpiece engaging portion includes a series of teeth spaced apart in the longitudinal direction by grooves, said button in said locking position thereof engaging said teeth to releasably couple said workpiece engaging portion to said trigger enabling portion and thereby fix the longitudinal length of said safety trip assembly, said button in said releasing position thereof being disengaged from said teeth to enable said workpiece engaging portion to be slid in the longitudinal direction with respect to the trigger enabling portion for adjusting the longitudinal length of the safety trip assembly.*

*20. A fastener driving tool according to claim 19, wherein said button has teeth and grooves on angled, longitudinally extending wall portions thereof and wherein said teeth and grooves on said workpiece engaging portion are formed on an angled, longitudinally extending wall structure of said workpiece engaging portion.*

*21. A fastener driving tool according to claim 15, wherein said workpiece engaging portion further comprises rearwardly extending wall structures integrally formed on a distal end of said workpiece engaging portion and surrounding at least a portion of a distal end portion of said nosepiece assembly, such that said workpiece engaging portion is movably mounted on said nosepiece assembly so as to allow longitudinal movement of said workpiece engaging portion with respect to said nosepiece assembly.*

*22. A fastener driving tool according to claim 14, wherein said movable lock is mounted to said trigger enabling portion for transverse movement relative to the longitudinal direction between the locking and releasing positions thereof and wherein said spring is positioned to bias said lock transversely to said locking position thereof.*

*23. A fastener driving tool according to claim 22, wherein said spring is mounted in compression so as to bias said lock into said locking position.*

*24. A fastener driving tool according to claim 23, wherein said spring is a coil spring.*

*25. A fastener driving tool according to claim 23, wherein said workpiece engaging portion includes a series of teeth spaced apart in the longitudinal direction by grooves, said movable lock in said locking position thereof engaging said teeth to releasably couple said workpiece engaging portion to said trigger enabling portion and thereby fix the longitudinal length of said safety trip assembly, said movable lock in said releasing position thereof being disengaged from said teeth to enable said workpiece engaging portion to be slid in the longitudinal direction with respect to said trigger enabling portion for adjusting the longitudinal length of the safety trip assembly.*

*26. A fastener driving tool according to claim 25, wherein said lock has teeth and grooves on angled, longitudinally extending wall portions thereof and wherein said teeth and grooves on said workpiece engaging portion are formed on an angled, longitudinally extending wall structure of said workpiece engaging portion.*

*27. A fastener driving tool according to claim 22, wherein said workpiece engaging portion further comprises rearwardly extending wall structures integrally formed on a distal end of said workpiece engaging portion and surrounding at least a portion of a distal end portion of said nosepiece assembly, such that said workpiece engaging portion is movably mounted on said nosepiece assembly so as to allow longitudinal movement of said workpiece engaging portion with respect to said nosepiece assembly.*

*28. A fastener driving tool according to claim 14, further comprising a button guide provide on said trigger enabling portion, said lock being a depressible button slidably mounted to said guide so as to be movable with respect thereto between said locking and releasing positions thereof.*

*29. A fastener driving tool according to claim 28, wherein said button is mounted to said guide for transverse movement relative to the longitudinal direction between the locking and releasing positions thereof and wherein said spring is positioned to bias said button transversely to said locking position thereof.*

*30. A fastener driving tool according to claim 29, wherein said spring is mounted in compression between said button and a portion of said button guide so as to bias said button into said locking position.*

*31. A fastener driving tool according to claim 30, wherein said spring is a coil spring.*

*32. A fastener driving tool according to claim 31, wherein said workpiece engaging portion includes a series of teeth spaced apart in the longitudinal direction by grooves, said button in said locking position thereof engaging said teeth to releasably couple said workpiece engaging portion to said trigger enabling portion and thereby fix the longitudinal length of said safety trip assembly, said button in said releasing position thereof being disengaged from said teeth to enable said workpiece engaging portion to be slid in the longitudinal direction with respect to said trigger enabling portion for adjusting the longitudinal length of the safety trip assembly.*

*33. A fastener driving tool according to claim 32, wherein said button has teeth and grooves on angled, longitudinally extending wall portions thereof and wherein said teeth and grooves on said workpiece engaging portion are formed on an angled, longitudinally extending wall structure of said workpiece engaging portion.*

*34. A fastener driving tool according to claim 28, wherein said workpiece engaging portion further comprises rearwardly extending wall structures integrally formed on a distal end of said workpiece engaging portion and surrounding at least a portion of a distal end portion of said nosepiece assembly, such that said workpiece engaging portion is movably mounted on said nosepiece assembly so as to allow longitudinal movement of said workpiece engaging portion with respect to said nosepiece assembly.*

*35. A fastener driving tool according to claim 14, wherein said workpiece engaging portion includes a series of teeth spaced apart in the longitudinally direction by grooves, said movable lock in said locking position thereof engaging said teeth to releasably couple said workpiece engaging portion to said trigger enabling portion and thereby fix the longitudinal length of said safety trip assembly, said movable lock in said releasing position thereof being disengaged from said teeth to enable said workpiece engaging portion to be slid in the longitudinal direction with respect to said trigger enabling portion for adjusting the longitudinal length of the safety trip assembly.*

*36. A fastener driving tool according to claim 35, wherein said lock has teeth and grooves on angled, longitudinally extending wall portions thereof and wherein said teeth and grooves on said workpiece engaging portion are formed on an angled, longitudinally extending wall structure of said workpiece engaging portion.*

*37. A fastener driving tool according to claim 35, wherein said movable lock is mounted to said trigger enabling portion for transverse movement relative to the longitudinal direction between the locking and releasing positions thereof and wherein said spring is positioned to bias said lock transversely to said locking position thereof.*

*38. A fastener driving tool according to claim 37, further comprising a button guide provided on said trigger enabling portion, said lock being a depressible button slidably mounted to said button guide so as to be movable with respect thereto between said locking and releasing positions thereof.*

*39. A fastener driving tool according to claim 38, wherein said spring is mounted in compression between said button and a portion of said button guide so as to bias said button into said locking position.*

*40. A fastener driving tool according to claim 39, wherein said spring is a coil spring.*

*41. A fastener driving tool according to claim 35, wherein said workpiece engaging portion further comprises rearwardly extending wall structures integrally formed on a distal end of said workpiece engaging portion and surrounding at least a portion of a distal end portion of said nosepiece assembly, such that said workpiece engaging portion is movably mounted on said nosepiece assembly so as to allow longitudinal movement of said workpiece engaging portion with respect to said nosepiece assembly.*

*42. A method for adjusting a length of a safety trip assembly in a fastener driving tool for driving fasteners into a workpiece, the safety trip assembly including a trigger enabling portion and a workpiece engaging portion slidably mounted to said trigger enabling portion for movement in a longitudinal direction with respect to said trigger enabling portion, said safety trip assembly being movable when said workpiece engaging portion is releasably coupled to said trigger enabling portion between an extended position and a retracted position whereby said trigger enabling portion enables said trigger mechanism to activate said fastener driving mechanism when manually actuated by a user when said safety trip assembly is in said retracted position and disables said trigger mechanism when said safety trip assembly is not in said retracted position; the method comprising:*

*manually engaging and moving a manually-operable, movable lock mounted to said trigger enabling portion against a biasing of a spring form (a) a locking position wherein said lock engages said workpiece engaging portion to releasably couple said workpiece engaging portion to said trigger enabling portion and thereby fix a longitudinal length of said safety trip assembly and a releasing position to (b) a releasing position wherein said lock is disengaged from said workpiece engaging portion;*

*while said lock is in said releasing position thereof, sliding said workpiece engaging portion in the longitudinal direction relative to said trigger enabling portion for adjusting the longitudinal length of the safety trip assembly; and*

*manually releasing said movable lock to allow said spring to bias said lock from said releasing position back into said locking position.*

*43. A method according to claim 42, wherein said movable lock is mounted to said trigger enabling portion for transverse movement relative to the longitudinal direction between the locking and releasing positions thereof and wherein said spring is positioned to bias said lock transversely to said releasing position thereof;*

*wherein manually engaging and moving said lock against the biasing of the spring from the locking position to the releasing position comprises manually engaging and moving said lock transversely against the biasing of the spring from the locking position to the releasing position.*

*44. A method according to claim 43, wherein a button guide is provided on said trigger enabling portion, wherein said lock is a depressible button slidably mounted to said button guide for movement between said locking and releasing positions thereof, and wherein said spring is mounted in compression between said button and a portion of said button guide so as to bias said button into said locking position;*

*wherein manually engaging and moving said lock against the biasing of the spring from the locking position to the releasing position comprises manually depressing said button to compress the spring.*

*45. A method according to claim 44, wherein said workpiece engaging portion includes a series of teeth spaced apart in the longitudinal direction by grooves,*

*wherein manually engaging and moving said lock against the biasing of the spring from the locking position to the releasing position comprises manually depressing said button from (a) said locking position thereof wherein said button engages said teeth to releasably couple said workpiece engaging portion to (b) said trigger enabling portion of said releasing position thereof wherein said button is disengaged from said teeth to enable said workpiece engaging portion to be slid in the longitudinal direction with respect to said trigger enabling portion.*

*46. A method according to claim 42, wherein a button guide is provided on said trigger enabling portion, wherein said lock is a depressible button slidably mounted to said button guide for movement between said locking and releasing positions thereof, and wherein and spring is mounted in compression between said button and a portion of said button guide so as to bias said button into said locking position;*

*wherein manually engaging and moving said lock against the biasing of the spring from the locking position to the releasing position comprises manually depressing said button to compress the spring.*

*47. A method according to claim 46, wherein said workpiece engaging portion includes a series of teeth spaced apart in the longitudinal direction by grooves,*

*wherein manually engaging and moving said lock against the biasing of the spring from the locking position to the releasing position comprises manually depressing said button from (a) said locking position thereof wherein said button engages said teeth to releasably couple said workpiece engaging portion to said trigger enabling portion to (b) said releasing position thereof wherein said button is disengaged from said teeth to enable said workpiece engaging portion to be slid in the longitudinal direction with respect to said trigger enabling portion.*

*48. A method according to claim 46, wherein said button is mounted to said button guide for transverse movement*

*relative to the longitudinal direction between the locking and releasing positions thereof and wherein said spring is positioned to bias said button transversely to said releasing position, thereof;*

*wherein mutually depressing said button to compress the spring comprises manually depressing said button transversely.*

*49. A method according to claim 42, wherein said workpiece engaging portion includes a series of teeth spaced apart in the longitudinal direction by grooves,*

*wherein mutually engaging and moving said lock against the biasing of the spring from the locking position to the releasing position manually engaging said lock from (a) said locking position thereof wherein said lock engages said teeth to releasably couple said workpiece engaging portion to said trigger enabling portion to (b) said releasing position thereof wherein said lock is disengaged from said teeth to enable said workpiece engaging portion to be slid in the longitudinal direction with respect to said trigger enabling portion.*

*50. A method according to claim 49, wherein said movable lock is mounted to said trigger enabling portion for transverse movement relative to the longitudinal direction between the locking and releasing positions thereof and wherein said spring is positioned to bias said lock transversely to said releasing position thereof;*

*wherein mutually engaging and moving said lock against the biasing of the spring from the locking position to the releasing position comprises manually engaging and moving said locking member transversely against the biasing of the spring from the locking position to the releasing position.*

*51. A method according to claim 49, wherein a button guide is provide on said trigger enabling portion, wherein said lock is a depressible button slidably mounted to said button guide for movement between said locking and releasing portions thereof, and wherein said spring is mounted in compression between said button and a portion of said button guide so as to bias said button into said locking position;*

*wherein manually engaging and moving said button against the biasing of the spring from the locking position to the releasing position comprises manually depressing said button to compress the spring.*

*52. A fastener driving tool for driving fasteners into a workpiece, comprising:*

*a housing assembly including a nosepiece assembly defining a longitudinally extending fastener drive track;*

*a fastener driving mechanism carried internally of said housing assembly and constructed and arranged to drive a fastener through said fastener drive track and into a workpiece when said fastener driver mechanism is selectively activated by a user;*

*manually actuable trigger mechanism constructed and arranged to activate said fastener driving mechanism when manually actuated by a user; and*

*a safety trip assembly coupled to said housing assembly for longitudinal movement with respect to said nosepiece assembly and including a trigger enabling portion and a workpiece engaging portion releasably coupled to said trigger enabling portion, said safety trip assembly being constructed and arranged to be movable between an extended position and a retracted position whereby said trigger enabling portion enables said trigger mechanism to activate said fastener driving mechanism when manually actuated by a user when said safety trip assembly is in said retracted position and disables said trigger mechanism when said safety trip assembly is not in said retracted position,*

*said safety trip assembly being constructed and arranged to be biased toward said extended position and to be moved toward said retracted position by engaging a longitudinal end of said workpiece engaging portion with a surface of a workpiece and pressing said housing toward the workpiece, thereby moving said safety trip assembly against said bias with respect to said nosepiece assembly and said body,*

*wherein said workpiece engaging portion is constructed and arranged to be movable with respect to said trigger enabling portion when said workpiece engaging portion is uncoupled from said trigger enabling portion to permit adjustment of a longitudinal length of said safety trip assembly, and*

*wherein said safety trip assembly includes a releasable coupling mechanism for releasably coupling said trigger enabling portion to said workpiece engaging portion, said releasable coupling mechanism comprising:*

*fixed locking structure formed on an exterior portion of said workpiece engaging portion;*

*a manually operable locking mechanism carried by said trigger enabling portion and including a button guide attached to said trigger enabling portion adjacent said fixed locking structure formed on said workpiece engaging portion and a depressible button slidably mounted on said button guide so as to be movable with respect thereto between a locking position and a releasing position, said button being constructed and arranged to engage said fixed locking structure when said button is in said locking position to interlock said button and said fixed locking structure to thereby prevent relative movement between said workpiece engaging portion and said trigger enabling portion and to disengage from said fixed locking structure when said button is in said releasing position to thereby permit relative movement between said workpiece engaging portion and said trigger enabling portion; and*

*a spring positioned adjacent to said button to generate a biasing force to urge said button into said locking position, said button and said spring being constructed and arranged to permit said button to be manually moved against said biasing force by a user's hand depressing said button to move said button from said locking position to said releasing position and to permit said button to automatically return to said locking position when said button is disengaged by the user's hand.*

*53. A fastener driving tool according to claim 52 wherein said button further comprises:*

*a series of teeth and grooves provided on said button constructed and arranged to engage teeth and grooves on said workpiece engaging portion.*

*54. A fastener driving tool according to claim 53 wherein said workpiece engaging portion further comprises rearwardly extending wall structures integrally formed on a distal end of said workpiece engaging portion and surrounding at least a portion of a distal end portion of said nosepiece assembly, such that said workpiece engaging portion is movably mounted on said nosepiece assembly so as to allow longitudinal movement of said workpiece engaging portion with respect to said nosepiece assembly.*

*55. A fastener driving tool according to claim 53 wherein said spring is a coil spring.*

*56. A fastener driving tool according to claim 53 wherein said workpiece engaging portion is constructed and arranged to be moved longitudinally with respect to said trigger enabling portion to adjust a depth of fastener drive.*

*57. A fastener driving tool according to claim 53 wherein the teeth and grooves on each of said button and said workpiece engaging portion extend transversely.*

*58. A fastener driving tool according to claim 57 wherein said button moves transversely between said locking and releasing positions thereof.*

*59. A fastener driving tool according to claim 58 wherein said spring is a coil spring.*

*60. A fastener driving tool according to claim 59 wherein said workpiece engaging portion is constructed and arranged to be moved longitudinally with respect to said trigger enabling portion to adjust a depth of fastener drive.*

*61. A fastener driving tool according to claim 58 wherein said workpiece engaging portion further comprises rearwardly extending wall structures integrally formed on a distal end of said workpiece engaging portion and surrounding at least a portion of a distal end portion of said nosepiece assembly, such that said workpiece engaging portion is movably mounted on said nosepiece assembly so as to allow longitudinal movement of said workpiece engaging portion with respect to said nosepiece assembly.*

*62. A fastener driving tool according to claim 53, wherein said teeth and grooves on said button are provided on angled, longitudinally extending wall portion of said button and wherein said teeth and grooves on said workpiece engaging portion are formed on an angled, longitudinally extending wall structure of said workpiece engaging portion.*

*63. A fastener driving tool according to claim 52 wherein said spring is a coil spring.*

*64. A fastener driving tool according to claim 52 wherein said button moves transversely between said locking and releasing positions thereof and wherein said spring is positioned to bias said button transversely to said releasing position thereof.*

*65. A fastener driving tool according to claim 64 wherein said button further comprises:*

*a series of teeth and grooves provided on said button constructed and arranged to engage teeth and grooves on said workpiece engaging portion.*

*66. A fastener driving tool according to claim 65 wherein the teeth and grooves on each of said button and said workpiece engaging portion extend transversely.*

*67. A fastener driving tool according to claim 66 wherein said workpiece engaging portion is constructed and arranged to be moved longitudinally with respect to said trigger enabling portion to adjust a depth of fastener drive.*

*68. A fastener driving tool according to claim 64 wherein said spring is a coil spring.*

*69. A fastener driving tool according to claim 68 wherein said button further comprises:* a series of teeth and grooves provided on said button constructed and arranged to engage teeth and grooves on said workpiece engaging portion.

*70. A fastener driving tool according to claim 69 wherein the teeth and grooves on each of said button and said workpiece engaging portion extend transversely.*

*71. A fastener driving tool according to claim 70 wherein said workpiece engaging portion is constructed and arranged to be moved longitudinally with respect to said trigger enabling portion to adjust a depth of fastener device.*

*72. A fastener driving tool according to claim 63 wherein said workpiece engaging portion is constructed and arranged to be moved longitudinally with respect to said trigger enabling portion to adjust a depth of fastener drive.*

*73. A fastener driving tool according to claim 69, wherein said teeth and grooves on said button are provided on angled, longitudinally extending wall portions of said button and wherein said teeth and grooves on said workpiece engaging portion are formed on an angled, longitudinally extending wall structure of said workpiece engaging portion.*

*74. A fastener driving tool according to claim 63 wherein said workpiece engaging portion further comprises rearwardly extending wall structures integrally formed on a distal end of said workpiece engaging portion and surrounding at least a portion of a distal end portion of said nosepiece assembly, such that said workpiece engaging portion is movably mounted on said nosepiece assembly so as to allow longitudinal movement of said workpiece engaging portion with respect to said nosepiece assembly.*

* * * * *